(12) United States Patent
Tsuchiya

(10) Patent No.: US 11,940,773 B2
(45) Date of Patent: Mar. 26, 2024

(54) WORKPIECE PROCESSING METHOD AND WORKPIECE PROCESSING MACHINE

(71) Applicant: SHIBAURA MACHINE CO., LTD., Tokyo (JP)

(72) Inventor: Koji Tsuchiya, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 360 days.

(21) Appl. No.: 17/606,356

(22) PCT Filed: Apr. 21, 2020

(86) PCT No.: PCT/JP2020/017157
§ 371 (c)(1),
(2) Date: Oct. 25, 2021

(87) PCT Pub. No.: WO2020/218278
PCT Pub. Date: Oct. 29, 2020

(65) Prior Publication Data
US 2022/0253034 A1    Aug. 11, 2022

(30) Foreign Application Priority Data

Apr. 26, 2019 (JP) ................................ 2019-085764
Mar. 26, 2020 (JP) ................................ 2020-055747

(51) Int. Cl.
*G05B 19/404* (2006.01)
*B23C 5/00* (2006.01)
(Continued)

(52) U.S. Cl.
CPC .............. *G05B 19/404* (2013.01); *B23C 5/00* (2013.01); *B23Q 15/12* (2013.01); *G05B 19/402* (2013.01); *G05B 2219/41116* (2013.01)

(58) Field of Classification Search
CPC ................ G05B 19/404; G05B 19/402; G05B 2219/41116; G05B 2219/50312;
(Continued)

(56) References Cited

U.S. PATENT DOCUMENTS 4,833,617 A * 5/1989 Wang .................. G05B 19/4163
700/173
5,825,017 A * 10/1998 Pryor ........................ F02F 1/24
250/559.08
(Continued)

FOREIGN PATENT DOCUMENTS

CN          1320979       6/2007
EP          2 191 923     6/2010
(Continued)

OTHER PUBLICATIONS

International Search Report dated Jul. 14, 2020 issued in PCT/JP2020/017157.
(Continued)

*Primary Examiner* — Michael J Brown
(74) *Attorney, Agent, or Firm* — DLA Piper LLP (US)

(57) ABSTRACT

A processing apparatus for processing a workpiece includes a tool holding part 9 for holding a tool 3 for processing a workpiece 5, a transferring part 11 for transferring the tool 3 for processing the workpiece 5 with the tool 3, and a control unit 13 for controlling the transferring part 11 so as to transfer the tool 3 with respect to the workpiece 5 on the basis of an NC program, and in the NC program, an arithmetic expression for calculating the position of the tool 3 is incorporated and the program is corrected on the basis of the relationship between the cutting transferring distance, the wear amount, and the deflection amount in addition to the contour error of the tool 3.

6 Claims, 23 Drawing Sheets

(51) Int. Cl.
*B23Q 15/12* (2006.01)
*G05B 19/402* (2006.01)
*B23C 3/00* (2006.01)

(58) Field of Classification Search
CPC ........... B23C 5/00; B23C 3/00; B23C 5/1009; B23C 2250/21; B23Q 15/12
USPC ....................................................... 700/193
See application file for complete search history.

(56) References Cited

U.S. PATENT DOCUMENTS

| | | | |
|---|---|---|---|
| 5,930,142 A | 7/1999 | Schleicher et al. | |
| 2006/0251484 A1* | 11/2006 | Yoshida | B23Q 17/2233 409/80 |
| 2019/0018391 A1* | 1/2019 | Rogers | G05B 19/4097 |

FOREIGN PATENT DOCUMENTS

| | | |
|---|---|---|
| JP | S63-233403 | 9/1988 |
| JP | H09-47942 | 2/1997 |
| JP | H09-62328 | 3/1997 |
| JP | 2005-144620 | 6/2005 |
| JP | 2010-237843 | 10/2010 |
| JP | 2011-237885 | 11/2011 |
| TW | 446599 | 7/2001 |
| TW | 201900887 | 1/2019 |
| WO | WO 2019/221005 | 11/2019 |

OTHER PUBLICATIONS

Written Opinion dated Jul. 14, 2020 issued in PCT/JP2020/017157.
Tawinese Office Action in TW Application No. 11020000230, dated Jan. 4, 2021.
Yi-Hsiung Chen et al. "Geometric Adaptive Control On CNC Turning", Journal of Technology, vol. 9, No. 1, pp. 21-28 (1994).

* cited by examiner

FIG. 1
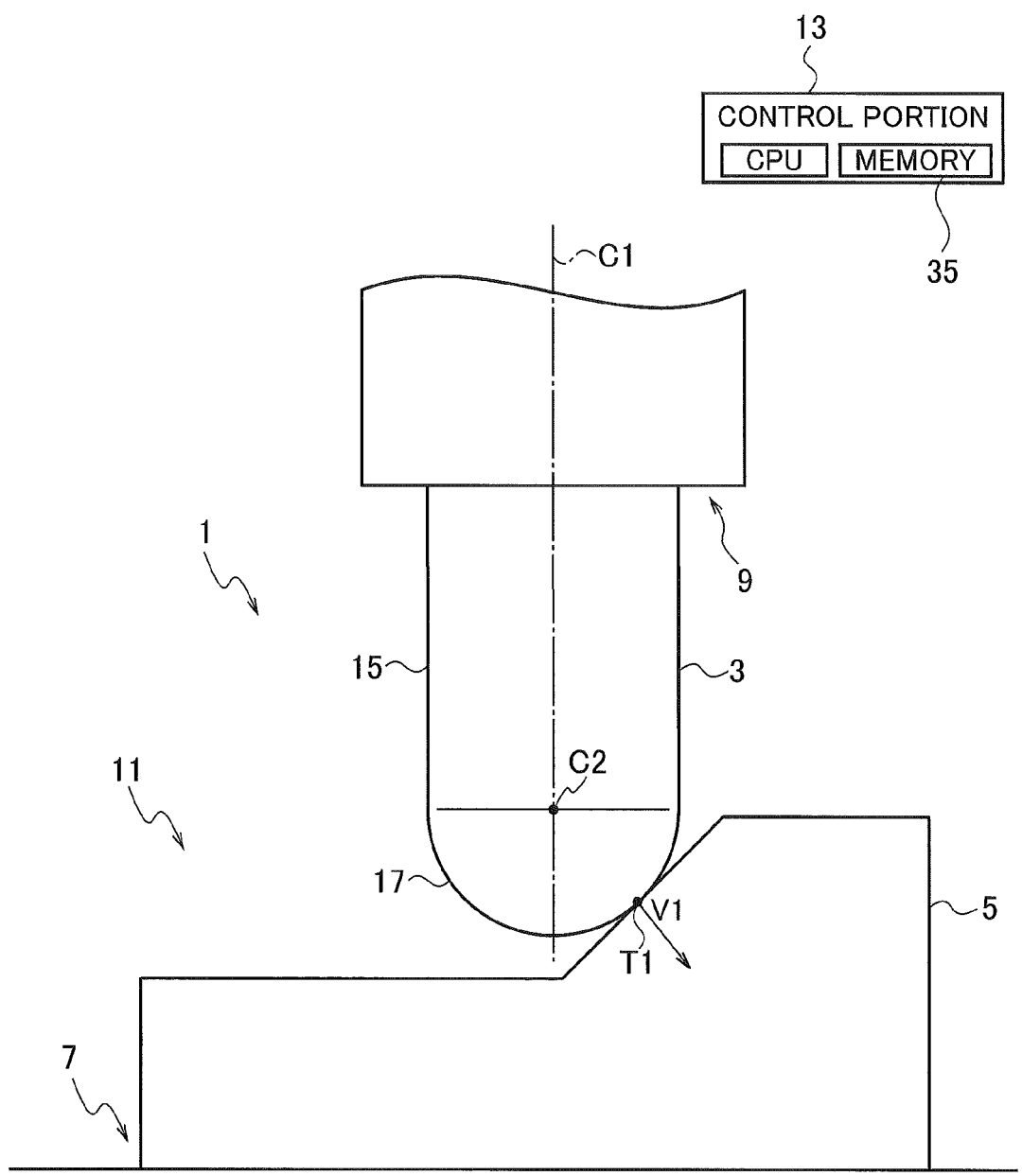
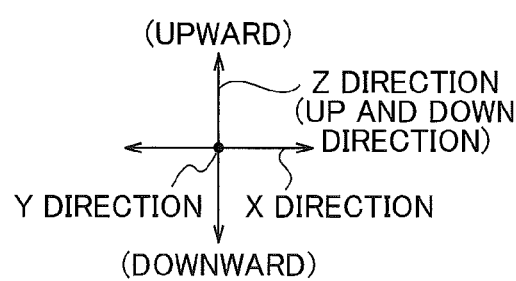

FIG. 3
(a)
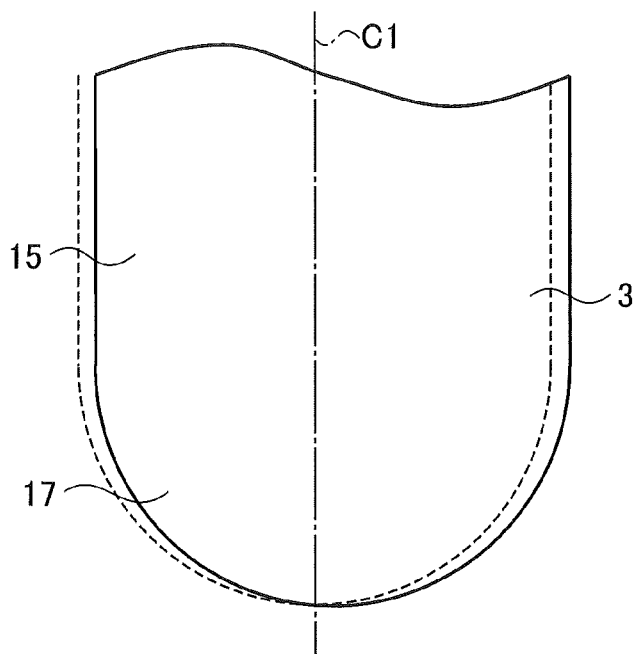
(b)
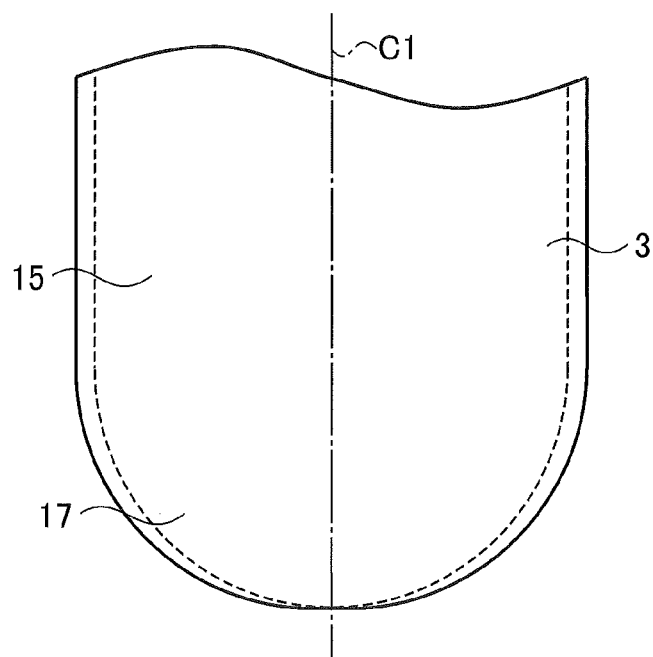

FIG. 11
(a)
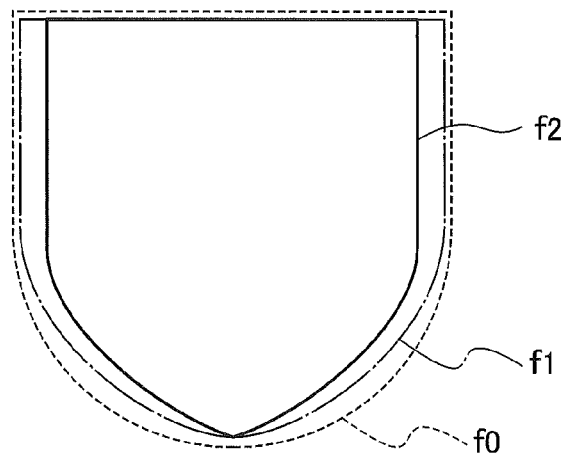
(b)
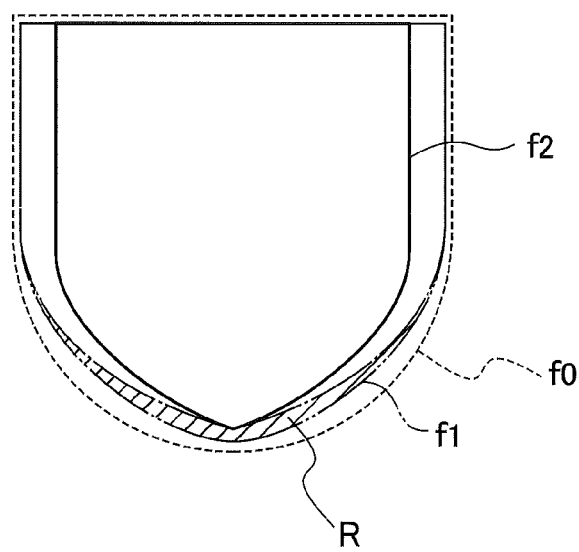

FIG. 14
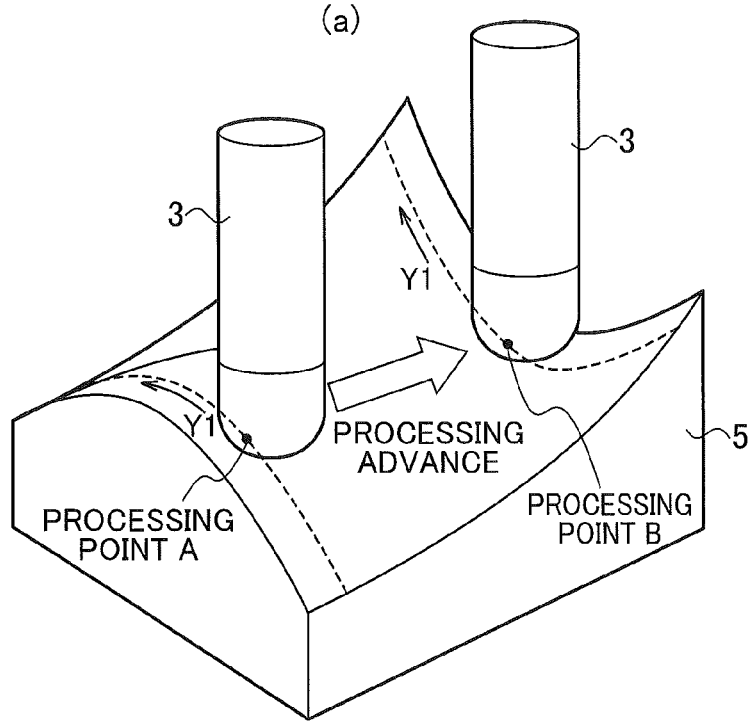
(a)
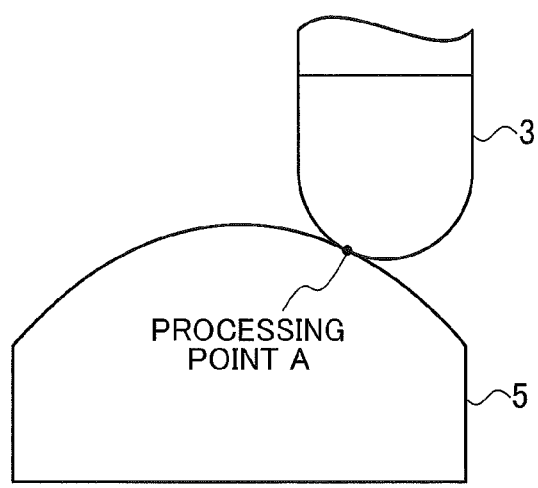
(b)
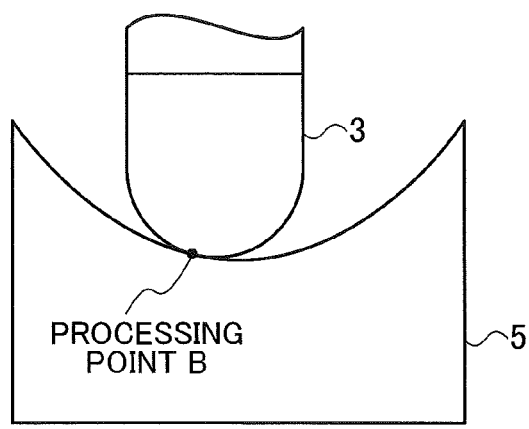
(c)

FIG. 16
(a)
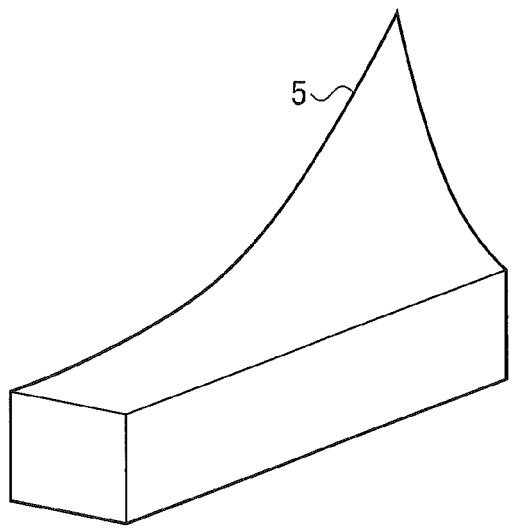
(b)
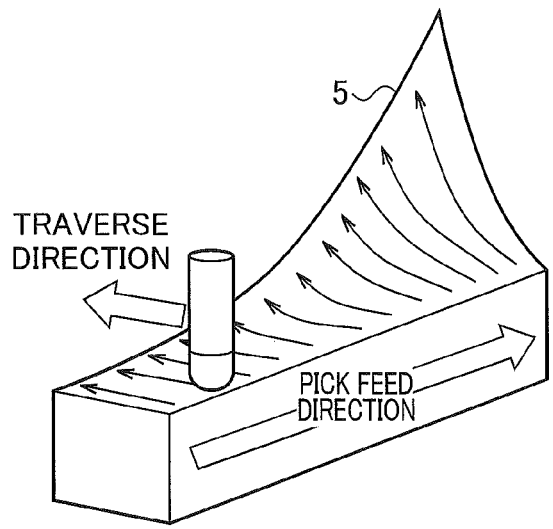
(c)
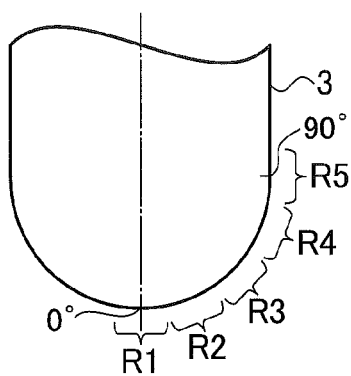
(d)
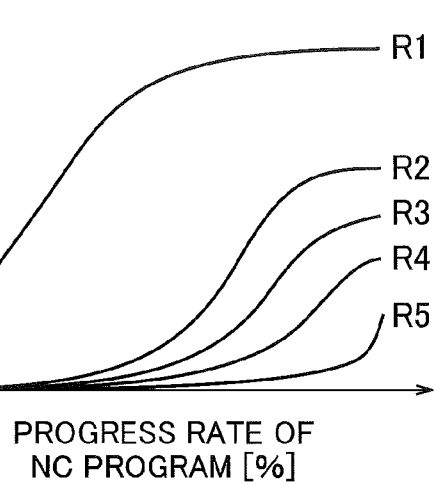

WORKPIECE PROCESSING METHOD AND WORKPIECE PROCESSING MACHINE

CROSS REFERENCE TO RELATED APPLICATIONS

This application is a U.S. National Stage Application of International Application No. PCT/JP2020/017157 filed Apr. 21, 2020, which claims priority from Japanese Patent Application No. 2019-085764 filed Apr. 26, 2019 and Japanese Patent Application No. 2020-055747 filed Mar. 26, 2020. The entirety of all the above-listed applications are incorporated herein by reference.

TECHNICAL FIELD

The present invention relates to a method of and an apparatus for processing workpiece and more particularly to a method for processing a workpiece with a tool by correcting the contour of the tool.

BACKGROUND ART

Conventionally, there has been known a workpiece processing apparatus (NC machine tool) for cutting a workpiece while relatively transferring a tool (tools) relative to the workpiece (work) by an NC program (Program).

In a conventional NC machine tool, for example, a tool such as an end mill is rotated, and the tool is relatively moved to a workpiece according to a specific number (such as decimal number) included in an NC program in order to process the workpiece. Here, Patent Literature 1 is described as a document showing a conventional technique.

PRIOR ART DOCUMENT

Patent Literature

Patent Literature 1: Japanese Unexamined Patent Application Publication No. 63-233403

SUMMARY OF THE INVENTION

The tool is deflected or worn depending on the cutting distance and the progress rate of the NC program. The deflection of the tool includes deflection of the tool itself, a change in attitude of a bearing of the tool, etc. Contour errors (difference between the ideal tool profile and the actual tool profile) are caused by the deflection and the wear of the tool. In machine tools for ultraprecision processing, contour errors of tools such as end mills account for most of the shape error factors of the workpieces.

Therefore, it is conceivable to minimize the shape error of the workpiece by processing the workpiece while correcting the position of the tool in accordance with the contour error of the tool. At this time, if the tool is relatively moved by the specific numbers included in the program, the configuration of the program becomes simple.

However, the use of the specific numbers generates a problem such that the NC program must be rewritten each time the tool is changed, worn or deflected.

In view of the above problems, it is an object of the present invention to provide a workpiece processing method and a workpiece processing machine for processing a workpiece wherein the position of a tool is corrected in accordance with a contour error of the tool without re-creating of the NC program each time the tool is changed, the tool is worn or warped, or the like.

A feature of the present invention is a processing method for processing a workpiece into a desired shape by a tool, wherein an arithmetic expression for correcting a position of the tool is incorporated into an NC program, a processing path along which the tool transfers is calculated according to the NC program, a cutting transfer distance for cutting the workpiece by each part of the tool is calculated from the processing path, a wear amount and a deflection amount of each part of the tool is calculated from the cutting transfer distance, the NC program is corrected by the wear amount and the deflection amount in addition to a contour error of the tool, and processing is performed by the corrected NC program.

An aspect of the present invention is the processing method wherein the NC program is corrected the position of the tool by using the arithmetic expression in order to suppress an occurrence of a processing error of the work due to the contour error of the tool.

Another aspect of the present invention is the processing method wherein a ratio of a correction amount due to the contour error without account the wear amount and the deflection amount and a correction amount due to a contour error with account the wear amount and the deflection amount are set, and the ratio of a correction amount due to a contour error without account the wear amount and the deflection amount is decreased and the ratio of a correction amount due to the contour error with account the wear amount and the deflection amount is increased as the processing path transfers from a start of the processing to an end of the processing.

According to another aspect of the present invention is the processing method wherein the wear amount is obtained from a change in a shape of the tool measured before and after processing, an uncut amount is obtained by subtracting a shape of the workpiece to be processed from the shape of the workpiece measured after processing, and the deflection amount is obtained by subtracting the wear amount from the uncut amount.

Another feature of the present invention is a processing apparatus for processing a workpiece into a desired shape by a tool, wherein an arithmetic expression for correcting a position of the tool is incorporated into an NC program, a processing path along which the tool transfers is calculated based on the NC program, a cutting transfer distance through which each part of the tool cuts the workpiece is calculated from the processing path, an wear amount and an deflection amount of each part of the tool is calculated from the cutting transfer distance, the NC program is corrected by the wear amount and the deflection amount in addition to a contour error of the tool, and processing is performed by the corrected NC program.

Another feature of the present invention is a method for generating an NC program for processing a workpiece into a desired shape by a tool, the method comprising: a step of incorporating into the NC program an arithmetic expression for correcting a position of the tool; a step of incorporating into the arithmetic expression a normal unit vector and a variable for correcting a contour error of the tool in a normal direction of a processing point; a step of calculating, based on the NC program, a processing path through which the tool transfers; a step of calculating, from the processing path, a cutting transfer distance in which each part of the tool cuts the workpiece; a step of calculating, from the cutting transfer distance, a wear amount and a deflection amount of each part of the tool; and a step of correcting the NC program by the wear amount and the deflection amount in addition to a contour error of the tool.

BRIEF DESCRIPTION OF DRAWINGS

FIG. 1 is a drawing which shows a workpiece and a tool in a workpiece processing apparatus according to an embodiment of the present invention.

FIG. 3 is an explanatory drawing which shows a tool profile error in a workpiece processing apparatus according to an embodiment of the present invention.

FIG. 7 is a drawing which shows position coordinates of the tool with the position corrected in the program of the workpiece processing apparatus according to the embodiment of the present invention.

FIG. 9 is a drawing which shows position coordinates of the tool with the position corrected at the location shown in FIG. 8.

FIG. 11 is an explanatory drawing which shows tool wear and deflection in a workpiece processing apparatus according to an embodiment of the present invention.

FIG. 14 is a view showing contact between a workpiece and a tool, wherein (a) shows a processing direction, (b) shows a manner of processing a convex surface, and (c) shows a manner of processing a concave surface.

FIG. 16 is a drawing which shows a cutting distance of the area of the tool tip; (a) is a view showing the surface of the workpiece; (b) is a view showing a processing direction by the tool; (c) is a view showing each area of the tool tip; and (d) is a graph showing the relationship between the NC program progress rate and the cutting transfer distance.

DESCRIPTION OF EMBODIMENTS

Hereunder, embodiments according to the present invention will be explained with reference to the drawings.

Figure 2:
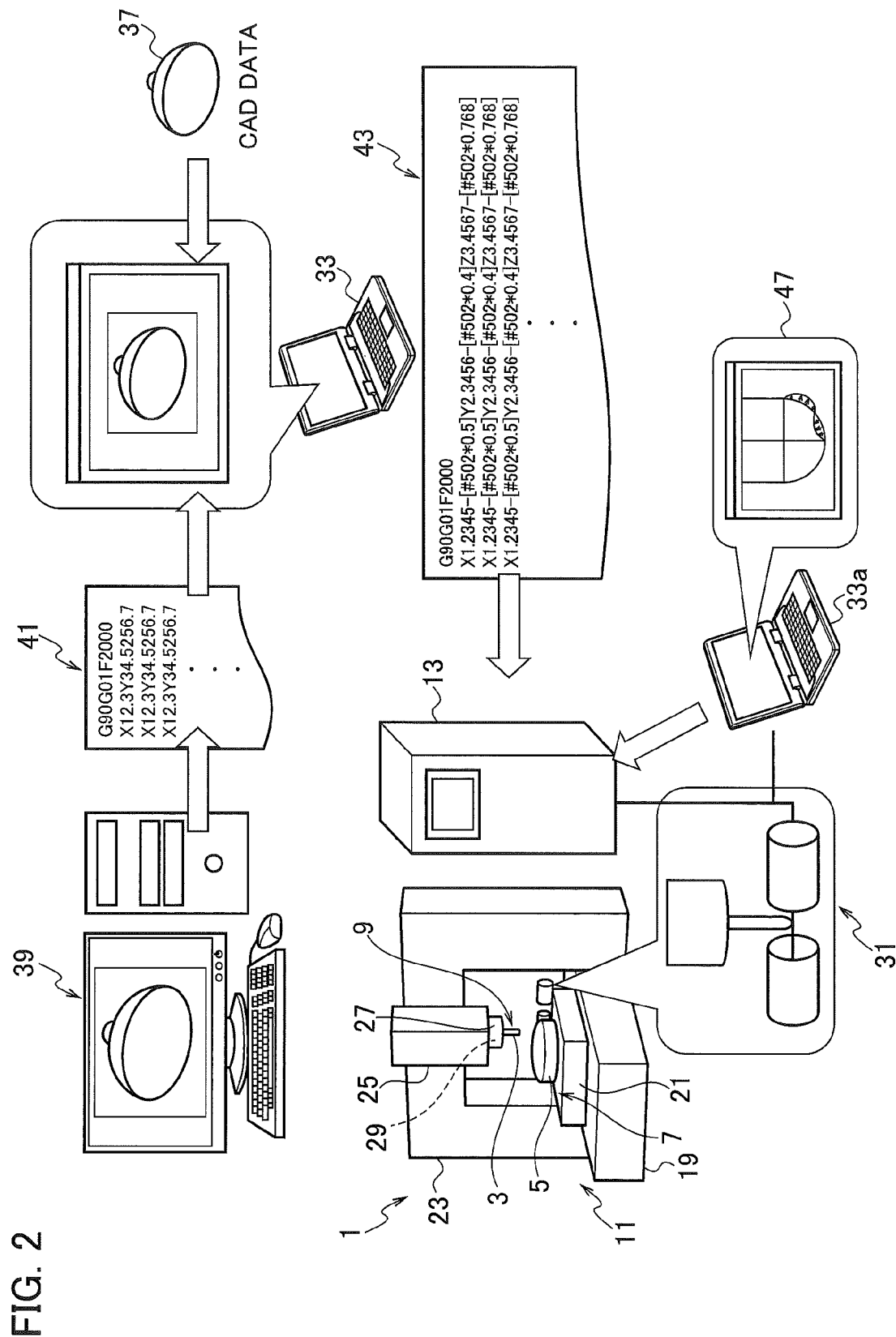
FIG. 2 is a drawing which shows a workpiece processing apparatus and system according to an embodiment of the present invention.

A workpiece processing apparatus (machine tool) 1 according to an embodiment of the present invention processes a workpiece 5 as a target object by using a tool (processing tool; for example, ball end mills) 3. The workpiece processing apparatus, as shown in FIGS. 1 and 2, comprises a workpiece holding portion 7, a tool holding portion 9, a transferring portion 11, and a control portion 13 (control unit).

Here, a predetermined direction in a space is defined as the X direction (X Axis Direction; transverse direction), a direction orthogonal to the X direction in the other predetermined direction in the space is defined as the Y direction (Y Axis Direction; anteroposterior direction), and a direction orthogonal to the X direction and the Y direction is defined as the Z direction (Z Axis Direction; up and down direction). In this definition, the X direction and the Y direction are horizontal, and the Z direction is vertical, but the definition is not limited to this, and the X direction or the Y direction may be vertical, or the X direction, the Y direction, and the Z direction may be oblique to the horizontal direction or the vertical direction.

The workpiece holding portion 7 is configured to hold the workpiece 5, and the tool holding portion 9 is configured to hold the tool 3. The held tool 3 (hereinafter referred to simply as "tool 3") held by the tool holding portion 9 processes (cutting) the held workpiece 5 (hereinafter referred to simply as "work 5") held by the workpiece holding portion 7.

A ball end mill as the tool 3 is provided with a cutting edge part on the outer periphery. More specifically, the ball end mill 3 includes a cylindrical proximal end portion 15 (FIG. 1) and a hemispherical distal end portion 17. An outer diameter of the base end portion 15 and a diameter of the tip portion 17 coincide with each other, and the tip portion 17 is attached to one end of the base end portion 15 in an extending direction of the central axis C1. The center axis of the distal end portion 17 and the center axis C1 of the proximal end portion 15 coincide with each other.

Here, a center of the circular end face (end face attached to the circular end face of the proximal end 15) of the tip portion 17 is defined as a center C2 of the tip portion 17. The center C2 lies on the center axis C1 of the tool 3.

A cutting blade of the ball end mill 3 is formed on the outer periphery of the tip part 17 and an end part (end on the tip 17 side) of the base end part 15. In the ball end mill 3, the other end of the base end part 15 is engaged with the tool holding portion 9 and held by the tool holding portion.

The tool 3 held by the tool holding portion 9 rotates (rotation around the center axis C1) to cut the workpiece 5 with a cutting blade.

The transferring portion 11 is configured to relatively move the tool 3 with respect to the workpiece 5 in order to process the workpiece 5 with the held tool 3. It is possible to move the workpiece 5 may with respect to the tool 3.

The control unit 13 controls the transferring portion 11 based on the NC program to move the tool 3 to the workpiece 5.

More specifically, as shown in FIG. 2, the processing apparatus 1 of the workpiece 5 includes a bed 19, a table 21, a column 23, a spindle support 25, a spindle casing 27, and a spindle 29.

The table 21 is supported by the bed 19 via a linear guide bearing (not shown). The table 21 is moved relative to the bed 19 in the X direction by an actuator such as a linear motor (not shown).

The column 23 is integrally provided on the bed 19. The main shaft support part 25 is supported by the column 23 via a linear guide bearing (not shown). The main shaft support part 25 is moved relative to the column 23 in the Y direction by an actuator such as a linear motor (not shown).

The main shaft housing 27 is supported by the main shaft support 25 via a linear guide bearing (not shown) The main shaft housing 27 is moved relative to the main shaft support 25 in the Z direction by an actuator such as a linear motor (not shown).

A spindle 29 is supported by the main shaft housing 27 via a bearing, and is rotatable with respect to the main shaft housing 27 around a center axis C1 (common to the central axis of the tool 3 extending in the Z direction) by an actuator such as a motor (not shown).

The spindle 29 is provided with the tool holding portion 9, and an upper surface of the table 21 is provided with the work holding portion 7. Thus, the held tool 3 transfers relatively to the workpiece 5 in the X, Y and Z directions.

In the NC program, an arithmetic expression (for example, mathematical expressions using four arithmetic operations) is incorporated for calculating the position (coordinates for work 5) of the tool 3. That is, the position coordinates at the time when the held tool 3 transfers are determined by the solution of the arithmetic expression.

Further, the NC program is configured to correct the position of the tool 3 by using an arithmetic expression in order to suppress the occurrence of the processing error of the workpiece 5 due to the contour error of the tool 3.

The position of the tool 3 is corrected by using a normal vector V1 with respect to a processing surface at a processing point T1 (described in detail below) of the tool 3 and a contour error with the tool 3. Thus, the three-dimensional position of the tool 3 is corrected in at least one of the X direction, the Y direction and the Z direction (depend on the normal vector V1).

First, there is described an initial calibration process (step 102 of FIG. 12, which is described later), which is a correction of a contour error measured by a tool shape measuring apparatus 31 shown in FIG. 2.

The contour error of the tool 3 is obtained in advance before actually processing the workpiece 5 by the tool shape measuring device 31. Hereinafter, the process of initially calculating the contour error of the tool 3 by using "Tool shape measuring device 31" is referred to as "initial calibration process".

The tool shape measuring device 31 is installed at a predetermined position of a workpiece processing apparatus 1. The held tool 3 is positioned at a position where the shape of the held tool 3 can be measured by a tool shape measuring device 31 (lasers, cameras, as a like). The held tool 3 is rotated (rotation about central axis C1), so that the outer shape of the held tool 3 is measured on an apparatus (namely, on the workpiece processing apparatus 1).

A difference (difference on the parts of the tool 3) between the measured external shape of the held tool 3 and an ideal external shape of the held tool (without shape error) is defined as the "contour error" of the tool 3.

A dashed line in FIG. 3A represents an outline shape of the tool having an ideal shape, and a solid line in FIG. 3A represents an actual outline shape of the tool 3 having a shape error. In FIG. 3(a), the tool is not rotated about the center axis C1. Further, the held tool 3 shown by a solid line in FIG. 3(a) is positioned slightly to the right with respect to the center axis C1.

A dashed line in FIG. 3B shows an outline shape of the tool having an ideal shape, and a solid line in FIG. 3B shows the outline shape when the actual tool 3 (tool 3 shown by solid lines in FIG. 3(a)) having a shape error is rotated around the center axis C1.

As a matter of course, the shape of the tool 3 shown by the solid line in FIG. 3B is symmetrical with respect to the center axis C1. If the workpiece 5 is processed by the tip 17 of the ball end mill 3, the contour error of the ball end mill 3 may be determined by an arc of ¼ of the tip 17 (that is, the range of the angle is 90°), as shown in FIG. 3.

As a tool shape measuring apparatus, there is disclosed in Japanese Unexamined Patent Application Publication No. 63-233403, for example.

The contour error of the tool 3 (ball end mill) will now be described in more detail with reference to FIG. 4.

Figure 4:
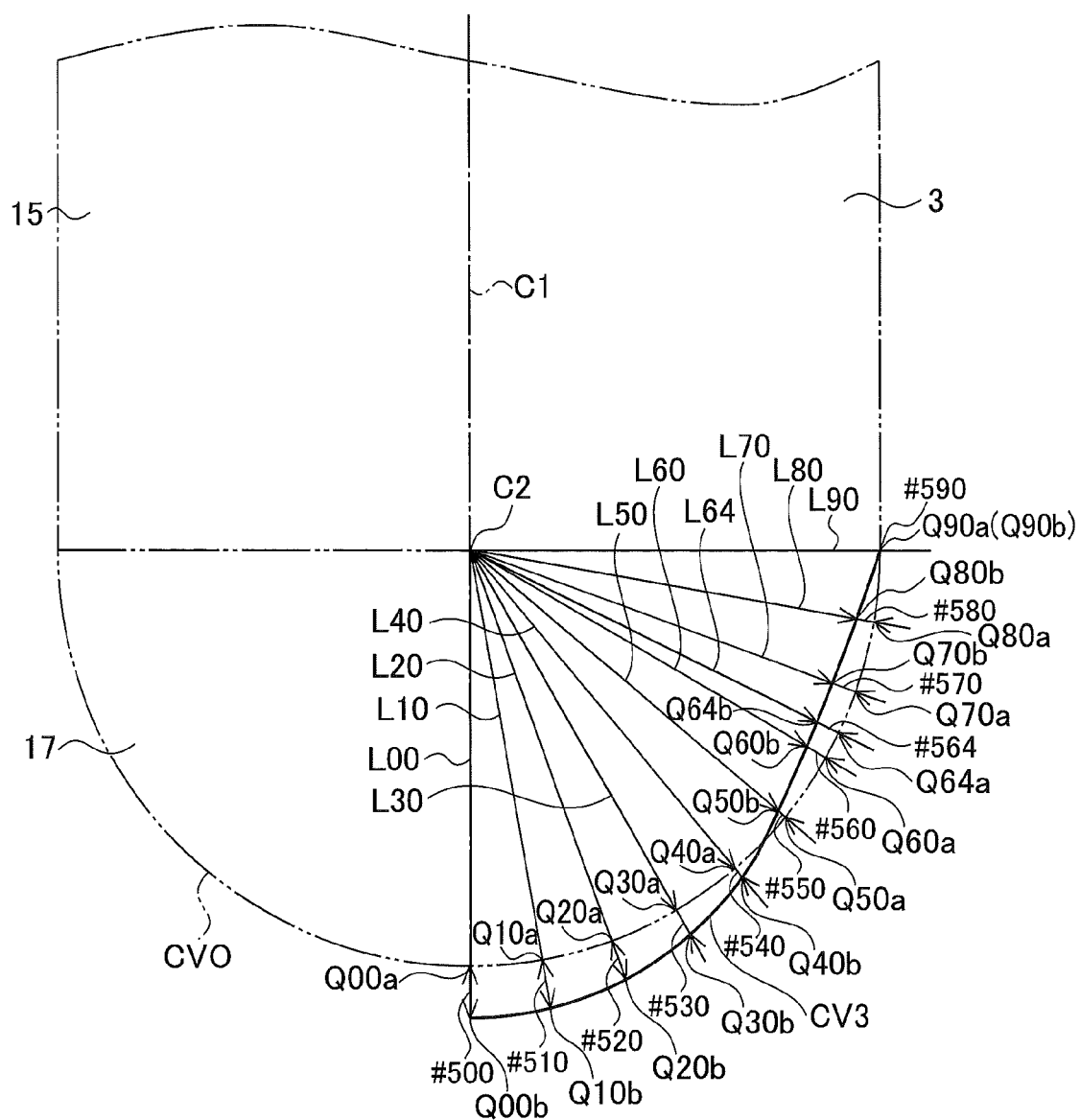
FIG. 4 is an explanatory drawing which shows a tool profile error in a workpiece processing apparatus according to an embodiment of the present invention.

A semi-circular arc shown by a chain double-dashed line in FIG. 4 is an outer shape of the tool without any shape error. A solid line in FIG. 4 shows an outer shape of the tip 17 of the tool 3 measured by the tool shape measuring device 31. In the figure, the contour error is exaggerated for easy understanding.

A plurality of half-lines L00 to L90 are drawn at an angle 10° apart each other so as to extend from a center C2 of a hemispherical tip part 17 of a tool 3 toward an outer shape of a ¼ circular arc of the tool 3. The intersecting angle between the center axis C1 of the tool 3 and the half straight line L00 is "0°". The intersecting angle between the center axis C1 of the held tool 3 and the half straight line L10 is "10°". Similarly, the angles of intersection between the central axis C1 of the held tool 3 and the half line L20 to the half line L90 is "20°"to "90°".

Here, an intersection point between the half straight line L00 and the ideal outline of the tool is defined as an intersection point Q00a. Similarly, intersections between the half-straight lines L10, L20, . . . L90 and the outer shape of the tool of the ideal shape are defined as intersections Q10a, Q20a, . . . Q90a. On the other hand, intersections between the half-straight lines L00, L10, L20, . . . , L90 and the outer shape of the actual tool 3 measured by the tool shape measuring device 31 are defined as intersections Q00b, Q10b, and Q20b, . . . , Q90b.

Then, the respective differences are stored in a memory or the like as reference symbols "#500 to #590". More specifically, there are made up that "#500=Q00b-Q00a", "#510=Q10b-Q10a", and so on "#590=Q90b-Q90a".

The values of the dimensions indicated by reference symbols (result in a program variable number) #500 to #590 are the distances between the intersections Q00a to Q90a with the outline of the tool of the ideal shape and the intersections Q00b to Q90b with the outline of the actual tool 3 in the half straight lines L00 to L90. The distances indicate the values of the contour errors of the tool 3 in the respective half straight lines.

In FIG. 4, since the intersecting angles of the half-lines L00 to L90 with respect to the central axis C1 of the tool 3 are inscribed at intervals of 10°, the contour error of the tool 3 is determined at 10 positions, but the intersecting angles may be inscribed at even finer intervals (for example, an interval of 1°).

That is, for example, the contour error of the tool 3 may be determined at 91 positions, such as the contour error (distance between intersection point Q64a and intersection point Q64b; #564) of the tool 3 at the half-line L64 where the intersection angle with the central axis C1 of the tool 3 is "64°".

The values of these contour errors are stored in advance in the memory of the PC 33 (memory 35 of the PC 33 or the control unit 13 may be used) as shown in FIG. 2 as data indicating the contour error of the tool 3 by executing the above-described "initial calibration process" using the tool shape measuring device 31 before the work 5 is processed by the tool 3. Reference numeral 47 in FIG. 2 denotes data indicating the contour error of the tool 3.

Now, there will be described an NC program (corrected NC program) for preventing deterioration of the processing accuracy of the workpiece 5 due to the contour error of the tool 3.

As shown in FIG. 2, the normal vector (unit normal vector) V1 at the processing point T1 (see FIG. 5) of the tool 3 is obtained from a CAD data (data showing the shape of the workpiece as a finished product) 37 and the processing path (NC program based on CAD data where tool contour error is "0") created by the CAM 39, for example, by the PC 33 (PC 33a may also be used).

When a cutting edge part of a hemispherical tip part 17 of a tool 3 cuts a workpiece 5, a contact point between the tool 3 and the workpiece 5 becomes a processing point T1.

More specifically, the tool 3 is moved relative to the workpiece 5 in the X, Y, or Z directions when the workpiece 5 is cut by the tool 3 at a predetermined cutting amount. In this processing, the point (where the shape of the workpiece is determined after processing) where the tool 3 is in contact with the workpiece 5 at the rearmost end in the transferring direction becomes the processing point T1, for example.

A vicinity of the processing point T1 around the processing point T1 is a curved surface, but it can also be considered that a very minute surface which is regarded as a plane exists. A normal vector V1 is a vector orthogonal to the extremely minute curved surface, and has a component in the X direction, a component in the Y direction, and a component in the Z direction. The scalar quantity of the normal vector V1 is "1".

That is, the normal vector V1 is a unit vector. In the present embodiment, the deviation amount (scalar quantity) of the tool 3 is calculated by the initial calibration process. Further, a normal vector V1 is calculated. Then, as described later, the normal vector V1 is decomposed in each of the X, Y, and Z directions, and the deviation amount is multiplied to calculate the deviation amount in the X, Y, and Z directions.

When the workpiece 5 is cut, the correction of the position of the held tool 3 will be further described.

Figures 5, 6:
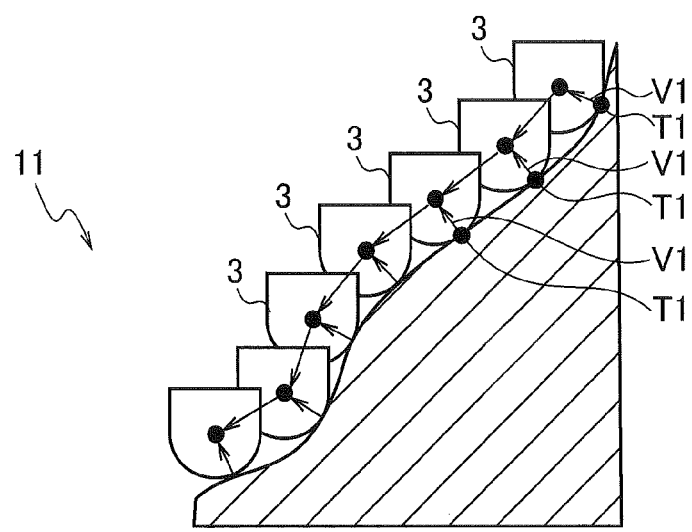
FIG. 5 is a drawing which shows a tool transfer path relative to a retained workpiece in a workpiece processing apparatus according to an embodiment of the present invention.
FIG. 6 is a drawing which shows position coordinates of a tool without position correction in a program of a workpiece processing apparatus according to an embodiment of the present invention.

As shown in FIG. 5, when the workpiece 5 is cut, the tool 3 transfers relative to the retained workpiece 5 in at least one of the X direction, the Y direction, and the Z direction. At this time, as shown in FIG. 6, for example, the coordinate value of the tool 3 transfers linearly from the coordinate value f51 (X-1.60657; Y-0.42583; Z-1.09809) over a predetermined period of time from the coordinate value f52 (X-1.62951; Y-0.6141; Z-1.09809). Similarly, the coordinate value f52 is moved to the coordinate value f53, the coordinate value f53 is moved to the coordinate value f54, and the coordinate value f54 is moved to the coordinate value f55 . . . . The processing point T1 is also moved as a matter of course.

FIG. 6 shows the coordinate values (part of the NC program) of the tool 3 when the contour error of the tool 3 is not corrected (at cutting with ideal tools).

Figure 7:
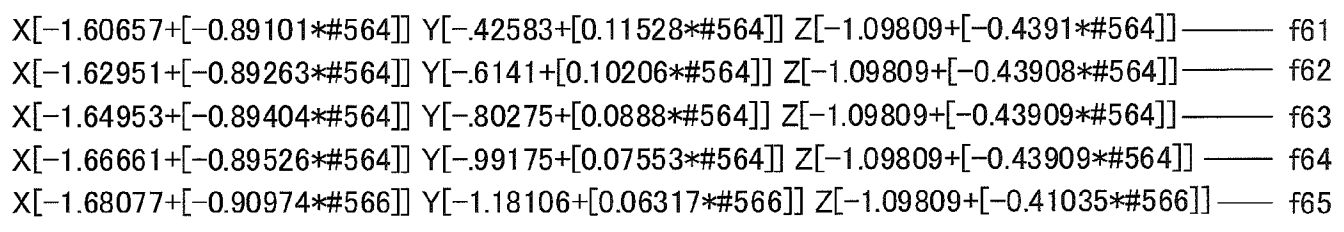

FIG. 7 shows coordinate values f51 to f55 obtained by adding the correction values to the coordinate values f61 to f65 shown in FIG. 6. By correcting the contour error of the tool 3, the tool 3 passes through . . . the coordinate value f61, the coordinate value f62, the coordinate value f63, the coordinate value f64, and the coordinate value f65 . . . in this order as shown in FIG. 7.

The coordinate value f61 and the coordinate value f62 . . . have arithmetic expressions, and are created by the PC 33 and sent to the control unit 13 of the workpiece processing apparatus 1. The control unit 13 calculates the arithmetic expression. Note that, instead of using the PC 33, the control unit 13 may generate the coordinate values f61 and f62 . . . having arithmetic expressions.

The coordinate value of the held tool 3 when correcting the contour error of the tool 3 will be described with reference to the coordinate value f61 as an example.

A "−1.60657" in the X coordinate at the coordinate value f6.1 is a coordinate value of the held tool 3 in the X direction before the correction is made (without correction of contour error). A "−0.89101" at the coordinate value f61 is the X-direction component of the normal vector V1 at the processing point T1. A symbol "*" in the coordinate value f61 is a symbol (x) for multiplication. A reference symbol "#564" in the coordinate value f61 is a contour error (scalar quantity) at the processing point T1 of the tool 3 as described with reference to FIG. 4.

A "−0.42583" in the Y coordinate at the coordinate value f61 is the coordinate value of the tool 3 in the Y direction before the correction (without correction of contour error). A "0.11528" in the coordinate value f61 is a Y-direction component of the normal vector V1 at the processing point T1. A reference symbol "#564" in the coordinate value f61 is a contour error (scalar quantity) at the processing point T1 of the tool 3 as described with reference to FIG. 4.

The "−1.09809" of the Z coordinate at the coordinate value f61 is the coordinate value of the tool 3 in the Z direction before correction (Without correction of contour error). The "−0.4391" at the coordinate value f61 is a Z-direction component of the normal vector V1 at the processing point T1. The reference symbol "#564" at the coordinate value f61 is a contour error (scalar quantity) at the processing point T1 of the held tool 3 as described with reference to FIG. 4.

A magnitude of the normal vector V1 having the X-direction component, the Y-direction component, and the Z-direction component in the coordinate value f61 is "1". In other words, it becomes "$((-0.89101 \ldots)^2 + (0.11528 \ldots)^2 + (-0.4391 \ldots)^2)^{1/2} = 1$".

An operation of the workpiece processing system including the processing apparatus 1, the PC 33, and the CAM 39 of the workpiece 5 as shown in FIG. 2 will now be described.

In an initial state, the tool 3 is held by a tool holding portion 9, the workpiece 5 is held by a workpiece holding portion 7, and the contour error of the held tool 3 is measured.

In the initial state, a processing path 41 is created by a CAM 39. And a processing path (Corrected processing passes) 43 corrected based on a contour error of a tool 3 is created by a PC 33 by CAD data 37 and the processing path 41. And the corrected processing path 43 is sent to the control device (control unit 13) of the workpiece processing apparatus 1.

Under a control of the control unit 13, the workpiece processing apparatus 1 controls the transferring portion 11 on the basis of a corrected processing path 43 in order to move the held tool 3 to the held workpiece 5 while rotating the held tool 3 as a result the held workpiece 5 is cut.

According to the workpiece processing apparatus 1, since an arithmetic expression for calculating the position (coordinate value) of the tool 3 is incorporated in the NC program, it is possible to eliminate the need to remake the NC program every time the tool is replaced or the tool is worn.

In other words, when a specific number is used, the NC program must be re-created every time a tool is changed or worn, etc., but by using an arithmetic expression, it is possible to cope with tool contour errors changed from time to time.

Further, by using an arithmetic expression, the measured tool contour value is stored in a variable, and calculation (operation) is performed at the time of processing, so that once the NC program is created, it can be used thereafter. Further, since the arithmetic expression of the NC program is calculated by the control unit 13, a dedicated device is not required.

Further, according to the workpiece processing apparatus 1, since the NC program is configured to correct the position of the tool 3 by using the arithmetic expression in order to suppress the occurrence of the processing error of the workpiece 5 due to the contour error of the tool 3. As a result, the configuration of the NC program can be simplified.

Further, according to the workpiece processing apparatus 1, since the normal vector V1 at the processing point T1 of the tool 3 is obtained by using the CAD data 37 and the processing path 41, and the position of the tool 3 is corrected by using an arithmetic expression including the normal vector V1 and the contour error of the tool 3 at the processing point T1, the position of the held tool 3 can be surely and accurately corrected.

In the above description, the NC program is supplied to the workpiece processing apparatus 1 from the external PC 33, but the NC program may be supplied to the workpiece processing apparatus 1 via media such as a memory card.

In the embodiment shown in FIG. 4, the contour error of the tool 3 is obtained in units of 1°. That is, the portion of the tool 3 for which the contour error is determined exists in a discontinuous state (not continuous), for example, in a jumping state every 1°.

Therefore, when the processing point T1 is a part of the tool 3 where the contour error does not exist, the contour error of the processing point T1 is calculated by using the contour error of two parts adjacent to each other with the processing point T1 therebetween. And, the position of the tool 3 is corrected by using the calculated contour error.

Figure 8:
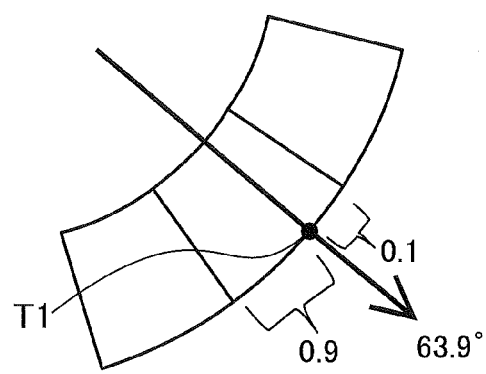
FIG. 8 is a drawing which shows a part of the tool being corrected.

More specifically, as described with reference to FIG. 4, the contour error of the tool 3 is obtained by setting the intersecting angle of the tool 3 with respect to the rotation center axis C1 at intervals of 1°. In practice, however, the processing point T1 of the tool 3 is, for example, at an angle of 63.9° as shown in FIG. 8.

In this case, the contour error of the tool 3 at an angle of 63.9° (middle angle) is obtained by using a reference symbol "#563" indicating the contour error of the tool 3 at one angle of 63° adjacent to the middle angle and a reference symbol "#564" indicating the contour error of the tool 3 at the other angle of 64° adjacent to the middle angle. In this case, since reference symbols "#564" denoting contour errors at an angle 64° is close to the intermediate angle of 63.9°, out of the one angle of 63°, the other angle of 64° are used in a biased manner.

By way of example, a first difference of 0.9° between the intermediate angle 63.9° and one angle 63° is obtained, and a second difference of 0.1° between the other angle 64° and the intermediate angle 63.9° is obtained.

There are obtained a first ratio "0.9" of a first difference 0.9° to 1° which is a difference between the other angle 64° and one angle 63° and a second ratio "0.1" of a second difference 0.1° to 1° which is a difference between the other angle 64° and one angle 63° are obtained.

The contour error of the tool at the intermediate angle 63.9° is obtained by a sum of a reference symbol "#564" indicating the contour error of the tool at the first ratio 0.9× the other angle 64° and a reference symbol "#563" indicating the contour error of the tool at the second ratio 0.1× one angle 63°.

Figure 9:
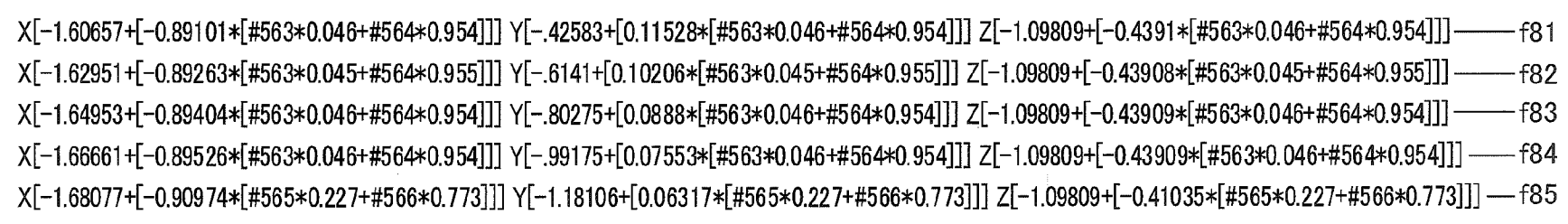

A coordinate value f81 shown in FIG. 9 will be used as an example to explain the coordinate value of the held tool 3 when the correction is performed with the contour error of the tool at an intermediate angle of 63.9°.

A "−1.60657" at the coordinate value f81 is the coordinate value in the X direction of the held tool before the correction is made (without correction of contour error). A "−0.89101" in the coordinate value f81 is the X-direction component of the normal vector at the processing point T1 of the coordinate value f81.

A reference symbol "#563" at the coordinate value f81 is a contour error (scalar quantity) at the processing point T1 of the held tool 3 as described with reference to FIG. 4. A "0.046" in the coordinate value f81 is a value (percentage of total) corresponding to the above-described second ratio "0.1".

A reference symbol "#564" at the coordinate value f81 is a contour error (scalar quantity) at the processing point T1 of the held tool 3 as described with reference to FIG. 4. A "0.954" in the coordinate value f81 is a value (percentage of total) corresponding to the above-described first ratio "0.9".

A "−0.42583" at the coordinate value f81 is the coordinate value of the tool 3 in the Y direction before the correction is made (without correction of contour error). A "0.11528" in the coordinate value f81 is a Y-direction component of the normal vector at the processing point T1 of the coordinate value f81.

A reference symbol "#563" at the coordinate value f81 is a contour error (scalar quantity) at the processing point T1 of the tool 3 as described with reference to FIG. 4. A "0.046" in the coordinate value f81 is a value (percentage of total) corresponding to the above-described second ratio "0.1".

A reference symbol "#564" at the coordinate value f81 is a contour error (scalar quantity) at the processing point T1 of the tool 3 as described with reference to FIG. 4. A "0.954" in the coordinate value f81 is a value (percentage of total) corresponding to the above-described first ratio "0.9".

A "−1.09809" at the coordinate value f81 is a coordinate value in the Z direction of the tool 3 before the correction (without correction of contour error). A "−0.4391" in the coordinate value f81 is a Z-direction component of the normal vector at the processing point T1 of the coordinate value f81.

A reference symbol "#563" at the coordinate value f81 is a contour error (scalar quantity) at the processing point T1 of the tool 3 as described with reference to FIG. 4. A "0.046" in the coordinate value f81 is a value (percentage of total) corresponding to the above-described second ratio "0.1".

A reference symbol "#564" at the coordinate value f81 is a contour error (scalar quantity) at the processing point T1 of the tool 3 as described with reference to FIG. 4. A "0.954" in the coordinate value f81 is a value (percentage of total) corresponding to the above-described first ratio "0.9".

A coordinate value f82, a coordinate value f83, a coordinate value f84, and a coordinate value f85 are interpreted in the same manner as the coordinate value f81.

When the contour error of the tool 3 is corrected (corrected by the contour error of the tool 3 at a middle angle), the tool 3 passes through . . . the coordinate value f81, the coordinate value f82, the coordinate value f83, the coordinate value f84, and the coordinate value f85 . . . in this order, as shown in FIG. 9, thereby carrying out a cutting of the workpiece 5.

Figure 10:
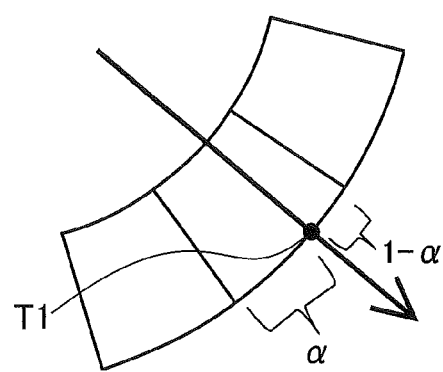
FIG. 10 is a drawing which shows a generalization of the aspects of FIGS. 8 and 9.

Although specific numbers are shown in FIGS. 8 and 9, the aspect shown in FIG. 8 is generalized as shown in FIG. 10(a), and the aspect shown in FIG. 9 is generalized as shown in FIG. 10(b).

According to the workpiece processing apparatus 1, a portion of the retained tool 3 for which the contour error is determined exists in a non-continuous skip state, and the processing point T1 may be a portion of the tool 3 for which the contour error does not exist. In such a case, the contour error of the processing point T1 is calculated by using the contour error of the two portions adjacent to each other with the processing point T1 therebetween. And, the position of the tool 3 is corrected by using the calculated contour error, so that the occurrence of a step or the like on the surface to be processed can be prevented. As a result, the workpiece 5 with better shape accuracy can be obtained.

As described above, in the initial calibration process, the contour error of the tool 3 (retained tool) is calculated by using the tool shape measuring device 31, and the initial configuration process is performed. Thereby, the amendment is performed by compensating the contour error of the tool 3.

Next, in addition to the initial calibration process, a process of correcting a contour error caused by wear or deflection of the tool 3 will be described.

In addition to the correction of the contour error measured by the tool shape measuring device 31, the present invention measures a wear amount (amount of wear) and a deflection amount (amount of deflection) of the tool 3 during the period from a start of processing of the workpiece 5 by the tool 3 to an end thereof, corrects the NC program in consideration of the shape of the tool 3 which changes due to the wear amount and the deflection amount, and carries out processing of the workpiece 5 with higher accuracy.

FIG. 11 is an explanatory view showing the shape of the tip of the tool 3. As shown in FIG. 11(a), a symbol f0 indicates an ideal tool shape, a symbol f1 indicates an actual tool shape, and a symbol f2 indicates a tool shape obtained by combining the deflection amount. As shown in FIG. 11(b), a hatched portion R indicates an amount of loss due to wear. A calculation of the loss amount R due to wear and the distortion amount f2 due to deflection will be described later in detail.

As seen from FIG. 11, the tool 3 changes shape thereof due to wear and deflection as processing continues. In the present invention, the NC program is corrected in consideration of changes in shape due to wear and deflection.

As a process for collecting the data of the wear amount, the work 5 is actually processed by using a tool 3, and the wear amount in this processing is measured and stored in the memory or the like.

In this processing, a processing path is acquired from the start of processing of the workpiece 5 by the tool 3 to the end of processing in an optional processing. The position where the tool 3 is in contact with the workpiece 5 and the position where the tool 3 is not in contact with the workpiece 5 are calculated in the processing pass. And, the transferring distance at the position where the tool 3 is in contact with the workpiece 5 is defined as "cutting transfer distance".

The processing procedure of the workpiece processing apparatus according to the embodiment of the present invention will now be described with reference to the flowchart shown in FIG. 12.

Figure 12:
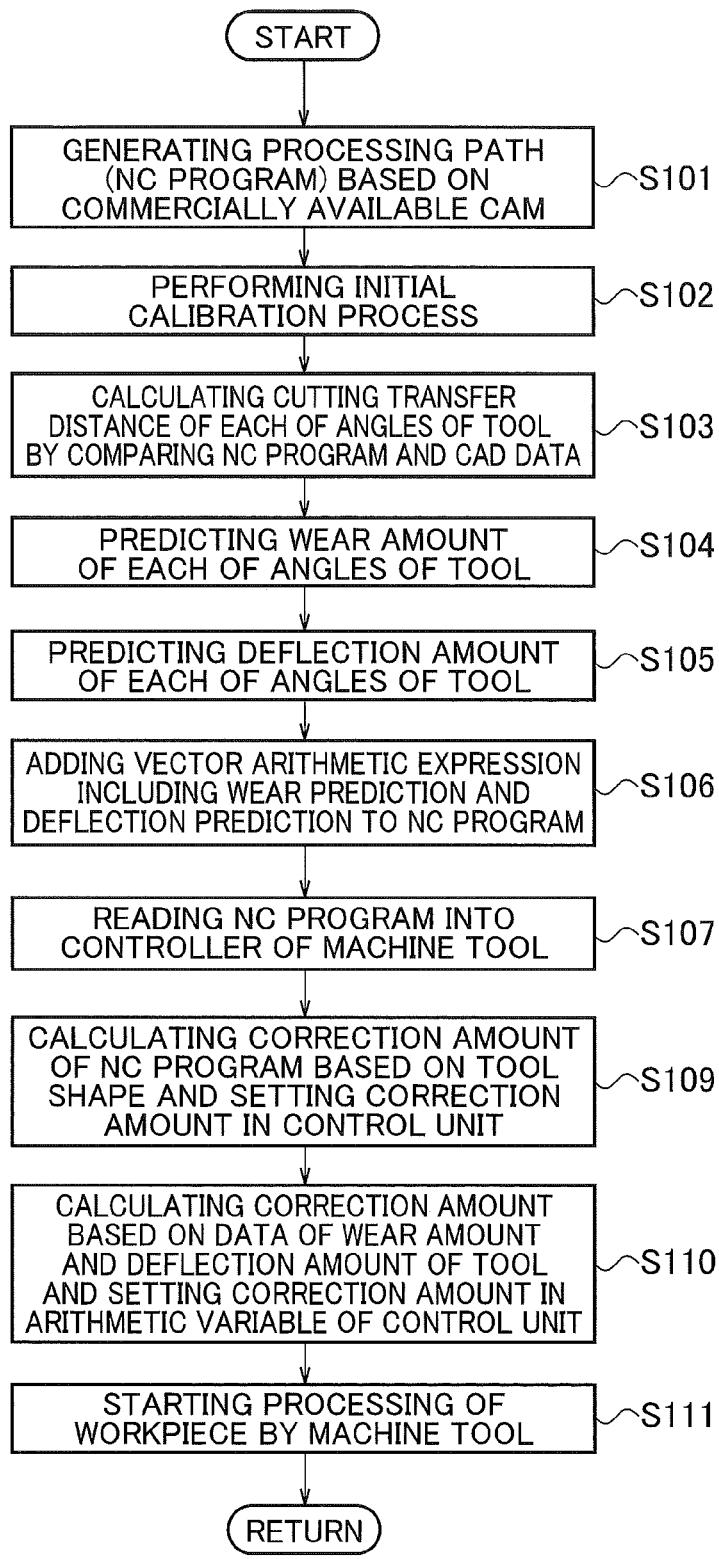
FIG. 12 is a flowchart showing a processing procedure of a workpiece processing apparatus according to an embodiment of the present invention.

First, in step 101 of FIG. 12, an NC program for processing the workpiece 5, that is, a three-dimensional coordinate of a processing path by the tool 3 is generated based on a commercially available CAM. In step 102, the above-described initial calibration process is performed.

In step 103, the NC program is compared with the CAD data of the machine tool, and the cutting transfer distance of each of the regions R1 to R5 of the tool 3 is calculated.

Figure 13:
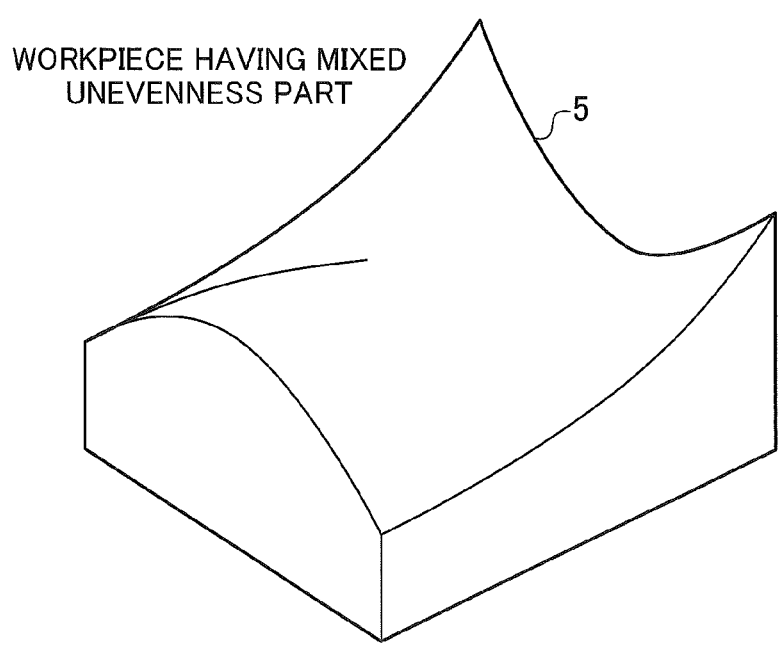
FIG. 13 is a drawing which shows a surface profile of a workpiece to be processed using a tool.

A calculation method of "cutting transfer distance" will now be described with reference to FIGS. 13 and 14. For example, when the workpiece 5 having a curved surface is cut using a tool as shown in FIG. 13, as shown in FIG. 14(a). The tool 3 is continuously transferred in a first direction (here, the direction indicated by the arrow Y1 is shown), further slid in a direction orthogonal to the first direction, and then transferred again in the direction of arrow Y1 for cutting. At this time, a portion where the tip of the tool 3 comes into contact with the workpiece 5 can be recognized according to the processing shape, for example, as the processing point A shown in FIG. 14(b) and the processing point B shown in FIG. 14(c).

That is, it is possible to calculate the distance by which the tip of the tool 3 comes into contact with the workpiece 5 when the tool 3 transfers from the start to the end of the processing by the tool 3, that is, the cutting transfer distance. It is to be noted that a judgment of contact and non-contact is made, for example, from the depth of processing by the tool 3 being 0.5 [μm] or more from the surface of the workpiece 5, and it is judged that the tool 3 and the workpiece 5 are in contact with each other. Alternatively, as another criterion, when the distance between the tool 3 and the surface of the finished shape of the workpiece 5 is equal to or less than a predetermined value, it is determined that the tool 3 and the workpiece 5 are in contact with each other. However, the invention is not limited to these.

Figure 15:
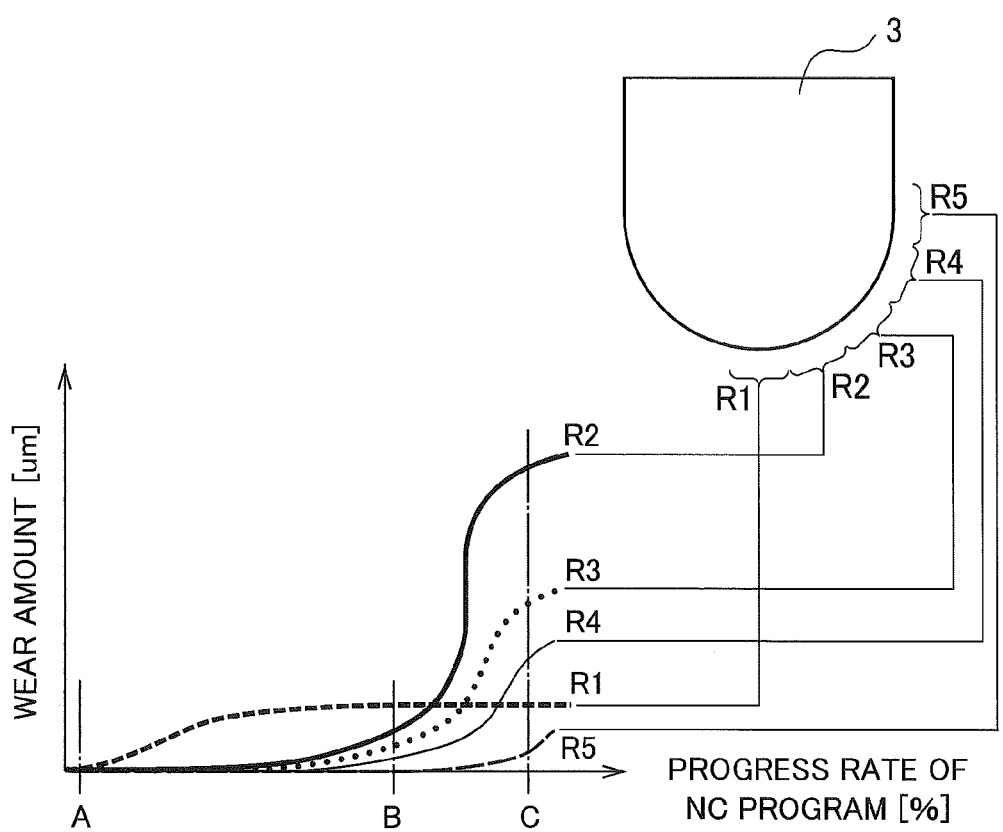
FIG. 15 is a graph showing the relationship between a progress rate of the NC program and a wear amount in each area.

In step 104, a wear amount M of each of the regions R1 to R5 for each cutting transfer distance is predicted. Specifically, the graph shown in FIG. 15 is generated, and the wear amount M corresponding to the progress rate is predicted for each of the regions F1 to R5.

Here, the relation between the cutting transfer distance and the wear amount of the tool 3 is calculated, and this relation is stored in the memory or the like as a correspondence table. The NC program is corrected by estimating the amount of the shape change of the tool 3 due to wear in actual processing. A detailed explanation will be given below with an example.

FIG. 16 is an explanatory view showing the procedure of processing the workpiece 5 using the tool 3 and the cutting transfer distance of the tool 3. FIG. 16(a) shows the shape of the workpiece 5, which has a flat surface portion and a curved surface portion on its surface. FIG. 16(b) is an explanatory view showing a processing path when the workpiece 5 is processed by the tool 3. As shown in FIG. 16(b), the workpiece 5 is processed while the tool 3 is moved in a first direction (traverse direction), and the workpiece 5 is processed while repeating the operation of sliding the workpiece 5 in a second direction (pick feed direction) orthogonal to the first direction and transferring the workpiece 5 in the first direction.

FIG. 16(c) is a diagram showing an area of a tip portion of the tool 3, and FIG. 16(d) is a graph showing a relationship between a progress rate [%] of the NC program and the cutting transfer distance of each portion of the tip portion of the tool 3.

As shown in FIG. 16(c), an axial direction of the tool 3 is defined as "0°", a direction orthogonal to the axis of the tool 3 is defined as "90°", a vicinity of 0° is defined as a region R1, a vicinity of 90° is defined as a region R5, and the tip of the tool 3 is divided into five regions R1, R2, R3, R4, and R5. Then, a distance for cutting the workpiece 5 by the regions R1 to R5 can be calculated from the data of the NC program, for example, as shown in the graph of FIG. 16(d) In this embodiment, an example of dividing into five regions R1 to R5 will be described, but the present invention is not limited thereto.

Therefore, when the workpiece 5 is processed, data of the cutting transfer distances of the respective regions R1 to R5 with respect to the progress rate of the NC program can be obtained. That is, in the present embodiment, the cutting transfer distance when the tool 3 is in contact with the workpiece 5 in the processing path of the tool 3 when the workpiece 5 is actually processed is calculated. At this time, with reference to the CAD data, the areas R1 to R5 where the tool 3 is in contact with the workpiece 5 are specified, and the cutting distances of the respective areas R1 to R5 are obtained.

Figure 17:
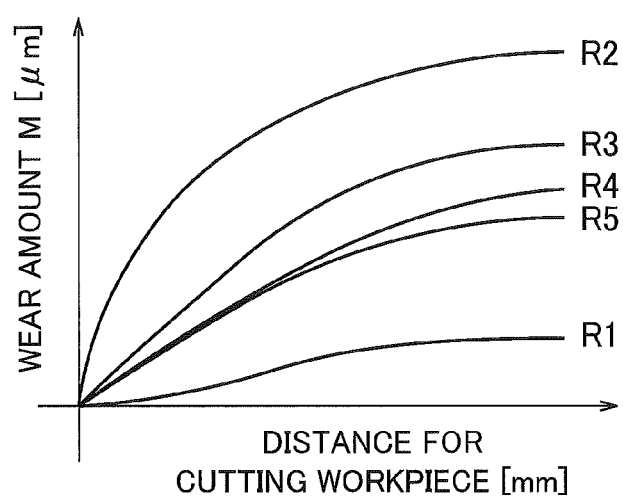
FIG. 17 is a graph showing the relationship between the cutting transfer distance and the wear amount.

FIG. 17 is a graph showing the relationship between the cutting transfer distance and the wear amount M of each region R1 to R5 when the tool 3 is operated according to the NC program to machine the workpiece 5.

The relationship between the cutting transfer distance and the wear amount M of each of the regions R1 to R5 is determined as follows.

First, as a process for collecting the data of the wear amount M, the workpiece 5 is actually processed by using the tool 3, and the wear amount during the processing is measured and stored in the memory or the like. That is, the wear amount of the tool 3 is obtained by comparing the measurement results of the tool shape before and after processing.

Then, the processing path from the start of processing of the workpiece 5 by the tool 3 to the end of processing is acquired, a place where the tool 3 is brought into contact with the workpiece 5 and a place where the tool 3 is not brought into contact with the workpiece 5 are calculated in the processing path, and a transferring distance at the place where the tool 3 is brought into contact with the workpiece 5 is defined as "cutting transfer distance".

In this way, the relationship between the cutting transfer distance and the wear amount M of each of the regions R1 to R5 can be obtained.

As can be understood from the graph of FIG. 17, it is understood that, if the cutting transfer distance is constant, the wear amount is small in the region R1 near the tip "0" of the tool 3, the wear amount is large in the region R2, and further, the wear amount is small toward the region R5. In general, the wear amount is R2>R3>R4>R5>R1.

The control unit 13 can estimate the wear amount of each of the regions R1 to R5 with respect to the progress rate of the NC program based on the graph shown in FIG. 16(d) and the graph shown in FIG. 17. Therefore, for example, the graph shown in FIG. 15 is obtained.

By referring to the graph shown in FIG. 15, the wear amount M of each of the regions R1 to R5 with respect to the progress rate of the NC program can be estimated. The shape of the tool 3 is corrected using the estimation result in order to perform high-precision processing. In the detailed correction method, the contour error due to the initial calibration process described above is calculated, and the NC program is corrected in consideration of the wear amount M described above.

Specifically, the wear amount M is calculated for each of 91 pieces angles from 0° to 90° of the tip of the tool 3, and a contour error based on the shape (that is, the shape of the tool 3 in consideration of the wear amount M) of the tool 3 when the NC program progress rate is 100% is stored in the memory of the control unit 13 as a reference symbol "#600~#690". That is, "#500 to #590" is a reference symbol due to a contour error not considering the wear amount M, and "#600 to #690" is a reference symbol due to a contour error considering the wear amount M.

Then, reference symbols #500 to #590 and reference symbols #600 to #690 are distributed according to the progress rate of processing to calculate a correction value and correct the NC program.

Figure 19:
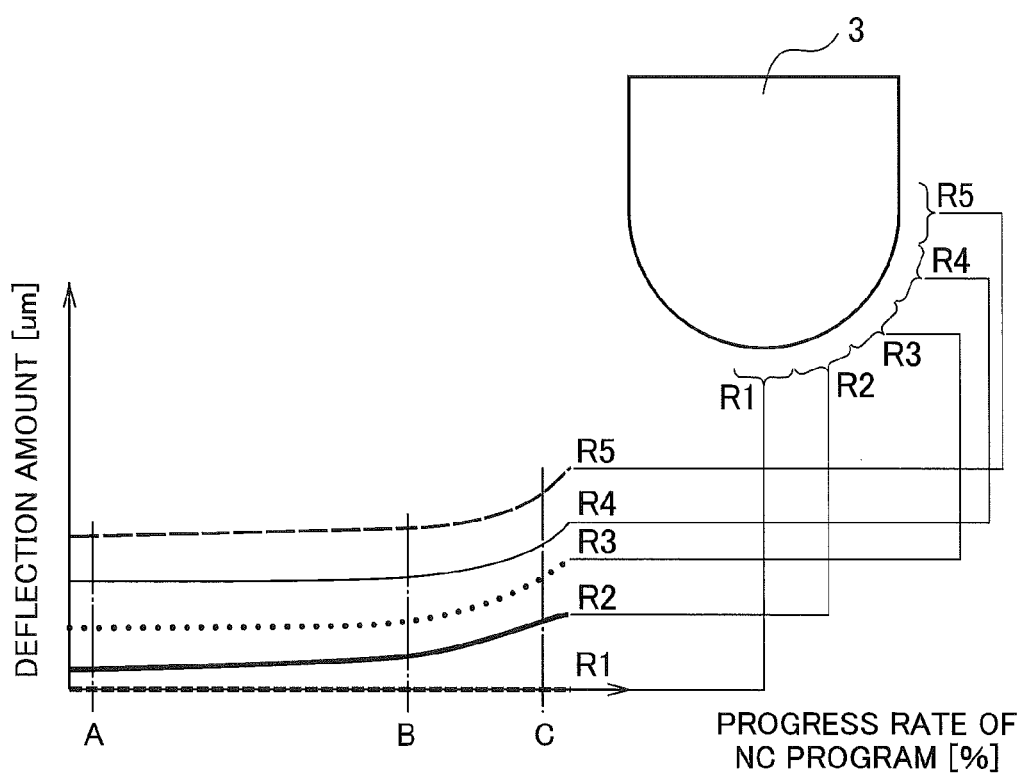
FIG. 19 is a graph showing the relationship between the progress rate of the NC program and the deflection amount in each region.

In step 105, a deflection amount L for each cutting transfer distance of each region R1 to R5 is predicted. Specifically, the graph shown in FIG. 19 is generated, and the deflection amount L corresponding to the progress rate is predicted for each of the regions R1 to R5.

Here, a relation between the cutting transfer distance and the deflection amount L of the tool 3 is calculated, and this relation is stored in the memory or the like as a correspondence table. The NC program is corrected by estimating the amount of the shape change due to the deflection of the tool 3 in the actual processing. The following is a detailed description.

FIG. 16 shows the procedure of processing the workpiece 5 using the tool 3 and the cutting transfer distance of the tool 3.

As described above, the distance for cutting the workpiece 5 by the regions R1 to R5 can be calculated from the data of the NC program, for example, as shown in the graph of FIG. 16(d). In this embodiment, an example of dividing into five regions R1 to R5 will be described, but the present invention is not limited thereto.

Therefore, when the workpiece 5 is processed, data of the cutting transfer distances of the respective regions R1 to R5 with respect to the progress rate of the NC program can be obtained.

Figure 18:
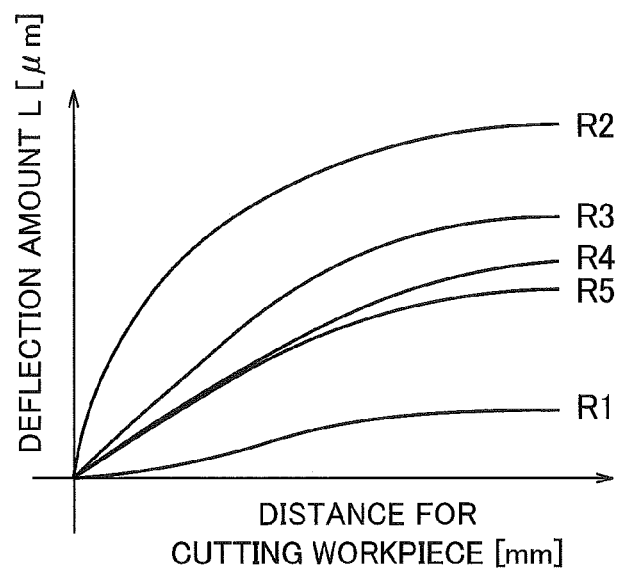
FIG. 18 is a graph showing the relationship between the cutting transfer distance and the deflection amount.

FIG. 18 is a graph showing the relationship between the cutting transfer distance and the deflection amount L of each region R1 to R5 when the tool 3 is operated according to the NC program to process the workpiece 5.

Here, the relationship between the cutting transfer distance and the deflection amount L of each of the regions R1 to R5 is obtained as follows.

First, data of the wear amount M of the tool 3 is collected. Here, the workpiece 5 is actually processed by using the tool 3, and the wear amount in this processing is measured and stored in the memory or the like. That is, the wear amount of the tool 3 is obtained by comparing the measurement results of the tool shape before and after processing.

Next, the shape of the workpiece after processing is measured, and the amount of unprocessed portions is obtained by comparing the measured shape with an original shape to be processed (CAD data, etc.). That is, since a cause of the unshaved portions is wear and deflection, when the amount of unshaved portions is larger than the wear amount, the amount of unshaved portions becomes deflection.

Therefore, the deflection amount can be obtained from an equation of the amount of unshaved work—the wear amount=the deflection amount.

Then, a processing path from the start of processing of the workpiece 5 by the tool 3 to the end of processing is acquired, a place where the tool 3 is brought into contact with the workpiece 5 and a place where the tool 3 is not brought into contact with the workpiece 5 are calculated in the processing path, and a transferring distance at the place where the tool 3 is brought into contact with the workpiece is defined as "cutting transfer distance".

Thus, the relationship between the cutting transfer distance and the deflection amount L of each of the regions R1 to R5 can be obtained.

As can be understood from the graph of FIG. 18, it is understood that if the cutting transfer distance is constant, the deflection amount L is small in the region R1 near the tip "0°" of the tool 3, the deflection amount L is large in the region R2, and further, the deflection amount L is small toward the region R5. That is, in general, the magnitude of the deflection amount L is R2>R3>R4>R5>R1.

Then, the control unit 13 can estimate the deflection amounts L of the regions R1 to R5 with respect to the progress rate of the NC program based on the graph shown in FIG. 16(d) and the graph shown in FIG. 18. For example, the graph shown in FIG. 19 is obtained.

By referring to the graph shown in FIG. 19, the deflection amounts L of the respective regions R1 to R5 with respect to the progress rate of the NC program can be estimated. The shape of the tool 3 is corrected using the estimation result to perform high-precision processing. In the detailed correction method, the contour error is calculated by the initial calibration process described above, and the NC program is corrected in consideration of the deflection amount L described above.

Specifically, the deflection amount L is calculated for each of 91 angles from 0° to 90° of the tip of the tool 3, and a contour error based on the shape (that is, the shape of the tool 3 in consideration of the deflection amount L) of the tool 3 when the NC program progress rate is 100% is stored in the memory of the control unit 13 as a reference symbol "#600~#690". That is, "#500 to #590" is a reference symbol due to a contour error which does not consider the deflection amount L, and "#600 to #690" is a reference symbol due to a contour error which considers the deflection amount L.

Then, reference symbols #500 to #590 and reference symbols #600 to #690 are distributed according to the progress rate of processing to calculate a correction value and correct the NC program.

Figure 20:
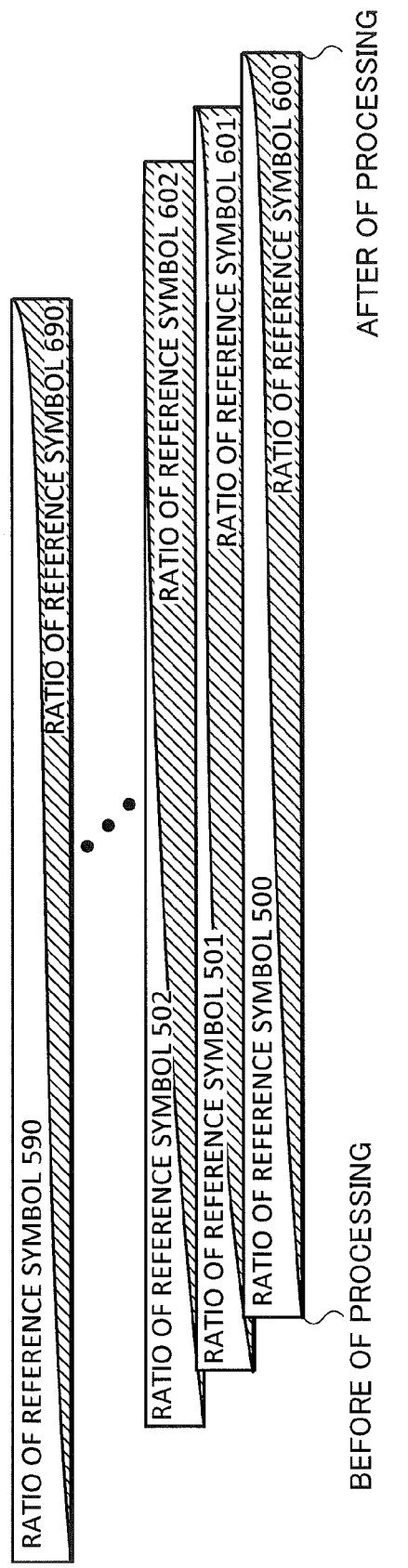
FIG. 20 shows the ratio of contour errors that do not account for wear and deflection to contour errors that account for wear and deflection.

FIG. 20 is an explanatory diagram showing the allocation rates of the reference symbols #500 and #600 for each angle from 0° to 90°. The distribution rate from the start of processing by the tool 3 to the end is set.

As can be seen from FIG. 20, before the start of processing, reference symbols #500 to #590 due to contour errors not taking into account the wear amount M and the deflection amount L are 100%, and reference symbols #600 to #690 due to contour errors taking into account the wear amount M and the deflection amount L are 0%. Thereafter, as the progress rate increases, the ratio of reference symbols #600 to #690 is increased, and the ratio of reference symbols #500 to #590 is decreased. At the end of processing, reference symbols #500 to #590 due to contour errors not considering the wear amount M and the deflection amount L are 0%, and reference symbols #600 to #690 due to contour errors considering the wear amount M and the deflection amount L are 100%.

For example, taking [−1.68077+[−0.90974*[#565*0.227+#566*0.773]]] as an example, which is the X component described in (f85) in FIG. 9, reference symbol "#565" is a numerical value obtained by dividing "#565" and "#665" by a predetermined ratio. Similarly, the reference point "#566" is a numerical value obtained by dividing "#566" and "#666" by a predetermined ratio.

Specifically, "#565" shown in (f85) of FIG. 9 is defined as "(0.667)*(#565)+(0.333) (#665)". In this case, the ratio of the reference symbol #565 due to the contour error not considering the wear amount M and the deflection amount L is "0.667", and the ratio of the reference symbol #665 due to the contour error considering the wear amount M and the deflection amount L is "0.333".

Figure 21:
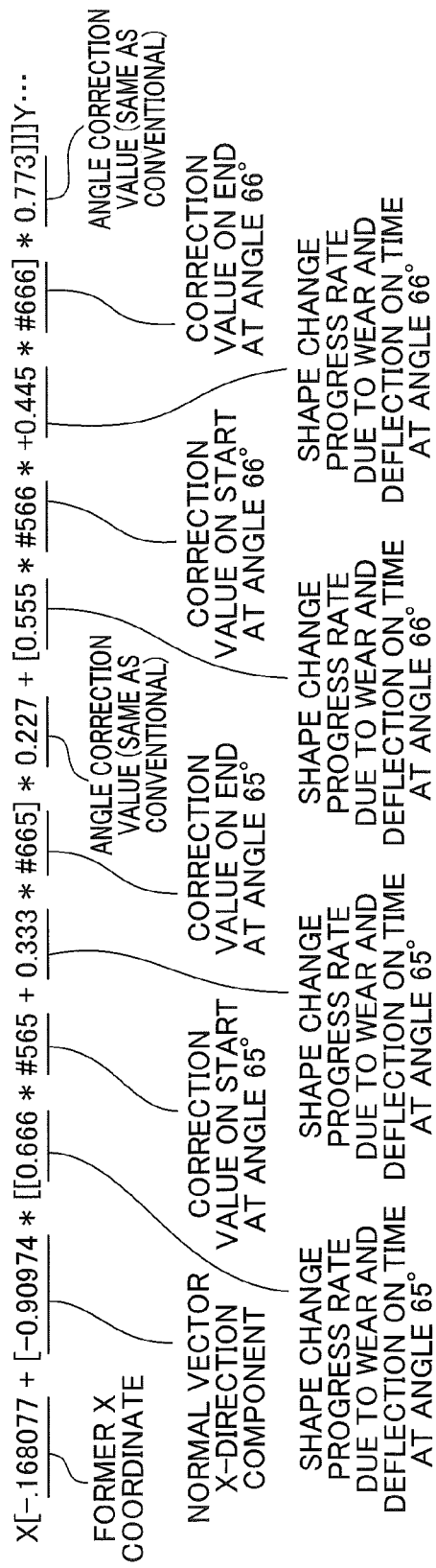
FIG. 21 is a drawing which shows a formula for correcting tool coordinates in a program of a workpiece processing apparatus according to an embodiment of the present invention.

That is, when the angle is 65°, X coordinates are calculated as shown by the equation in FIG. 21. Although the Y coordinate and the Z coordinate are not described, they are arithmetic expressions similar to the X coordinate.

An actual tool shape after changes due to wear and deflection is not known until processing is completed and measurements are performed. However, the wear amount and the deflection amount can be estimated by referring to the graphs shown in FIGS. 15 and 19.

In step 106, a vector arithmetic expression including wear prediction and deflection prediction is added to the NC program, and the total wear amount at each angle (0° to 90°) of the tool 3 at the end of processing is stored in a special file or the like.

In step 107, the NC program is read into the control unit 13 of the machine tool 1.

In step 109, a correction amount of the NC program is calculated based on the tool shape collected in the process of step 102, and a reference symbol (#500 to #590) is set in a memory or the like of the control unit 13.

In step 110, a correction amount of the NC program is calculated based on the data of the wear amount and the deflection amount of the tool 3, and a reference symbol (#600 to #690) is set in the memory or the like of the control unit 13. Thereafter, in step 111, the processing by the tool 3 is started.

Thus, the NC program is corrected based on the contour error in consideration of the wear amount M and the deflection amount L of the tool 3, and the tool 3 is operated to perform processing of the workpiece 5.

Thus, in the workpiece processing apparatus, the wear amount and the deflection amount of the tool 3 which fluctuate as the processing of the workpiece 5 advances are measured in advance. And, the wear amount and the deflection amount corresponding to the cutting transferring distance are estimated. Then, as the processing progresses after the start of the processing of the workpiece 5 by the tool 3, the NC program is corrected by changing the ratio of a reference symbol "#500 to #590" due to a contour error not considering the wear amount M and the deflection amount L and a reference symbol "#600 to #690" due to a contour error considering the wear amount M and the deflection amount L. Therefore, the NC program is appropriately corrected according to the contour error of the tool 3 and the wear amount of the tool 3, and the workpiece 5 can be processed with high accuracy.

The ratios of reference symbols #500 to #590 and #600 to #690 have been described with reference to the ratio shown in FIG. 20 as an example, but the present invention is not limited to this and can be appropriately changed according to the shapes and situations of the workpiece 5 and the tool 3.

The above description may be understood as a method of processing a workpiece.

That is, the method for processing the workpiece comprises a workpiece holding stage for holding the workpiece, a tool holding stage for holding a tool for processing the retained workpiece held in the workpiece holding stage, and processing the retained workpiece with the retained tool held in the tool holding stage. For this purpose, a transferring stage for transferring the held tool to the held work is provided, and the transferring stage is a stage for transferring the held tool to the held work based on an NC program. Therefore, the NC program may be understood as a method of processing a workpiece by incorporating an arithmetic expression for calculating the position of the held tool.

In the workpiece processing method, the NC program may correct the position of the retained tool by using the arithmetic expression in order to suppress the occurrence of the processing error of the retained workpiece due to the contour error of the retained tool.

Further, in the method of processing the workpiece, the portion of the held tool for which the contour error is determined exists in a non-continuous jumping state, and the processing point may be the portion of the held tool for which the contour error does not exist. In this case, the contour error of the processing point may be calculated using the contour error of two portions adjacent to each other with the processing point therebetween, and the position of the held tool may be corrected using the calculated contour error.

Further, in the workpiece machining method, a processing pass, which is a path transferring the held tool with respect to the workpiece, is calculated based on the NC program from a time when the held tool starts processing the workpiece to a time when the machining is completed. Then, a cutting transferring distance, which is a distance for cutting the workpiece at each part of the held tool, is calculated, and the relationship between the cutting transferring distance and the wear amount and the deflection amount for each part is obtained according to the wear amount and the deflect ion amount at each part when the processing by the held tool is completed. In addition to the contour error of the held tool, the NC program may be corrected based on the relationship between the cutting movement distance, the wear amount and the deflection amount.

Further, in the work processing method, a ratio of a correction amount due to a contour error not considering the wear amount and the deflection amount and a correction amount due to a contour error considering the wear amount and the deflection amount may be set. And the ratio of a correction amount due to a contour error not considering the wear amount and the deflection amount may be decreased and the ratio of a correction amount due to a contour error considering the wear amount and the deflection amount may be increased as the processing pass transfers from the start of the processing to the end of the processing.

Further, the above described contents may be understood as a program (NC Program; work Processing program).

That is, the program may be understood as a program for causing a workpiece processing apparatus to execute a transferring procedure for transferring the held tool with respect to the held workpiece in order to process the held workpiece held by the workpiece holding unit with the held tool held by the tool holding unit. Namely, an arithmetic expression for calculating the position of the held tool is incorporated in the program.

In the program, the position of the held tool may be corrected using the arithmetic expression in order to suppress the occurrence of the processing error of the held work due to the contour error of the held tool.

Further, in the program, when the portion of the retained tool for which the contour error is determined exists in a non-continuous skip state and the processing point is the portion of the retained tool for which the contour error does not exist, the contour error of the processing point may be calculated using the contour error of two portions adjacent to each other with the processing point therebetween. Therefore, the position of the retained tool may be corrected using the calculated contour error.

Further, in the program, a machining pass, which is a path transferring the held tool with respect to the workpiece, is calculated from the start of the processing of the workpiece by the held tool to the end of the machining, based on the NC program, and a cutting transferring distance, which is a distance at which each part of the held tool cuts the workpiece, is calculated. Then, the relationship between the cutting movement distance, the wear amount and the deflection amount for each of the portions is obtained according to the wear amount and the deflection amount of each of the portions when the processing by the held tool is completed. In addition to the profile error of the held tool, the NC program may be corrected based on the relationship between the cutting movement distance, the wear amount and the deflection amount.

In the program, it is possible to set a ratio of a correction amount due to a contour error not considering the wear amount and the deflection amount and a correction amount due to a contour error considering the wear amount and the deflection amount. And, it is possible to decrease the ratio of a correction amount due to a contour error not considering the wear amount and the deflection amount and to increase the ratio of a correction amount due to a contour error considering the wear amount and the deflection amount as the processing pass transfers from the start of the processing to the end of the processing.

Next, another embodiment of the processing procedure of the workpiece processing apparatus according to the present invention will be described with reference to flowcharts shown in FIGS. 22 and 23. In another embodiment, the processing procedure of the processing apparatus from the sample processing to the main processing will be described.

Figure 22:
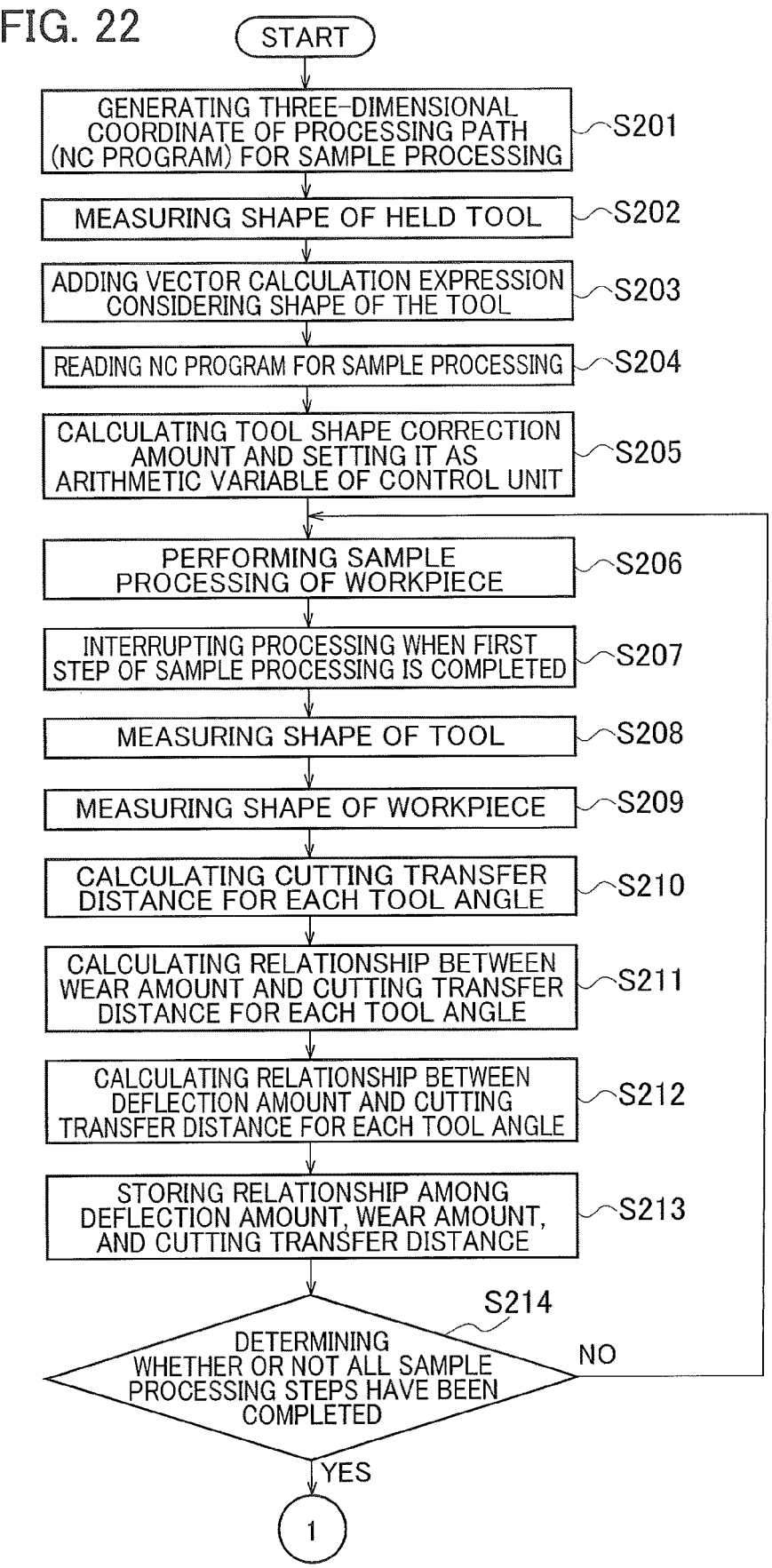
FIG. 22 is a flowchart of another embodiment of a processing procedure of a workpiece processing apparatus according to the present invention.
Figure 23:
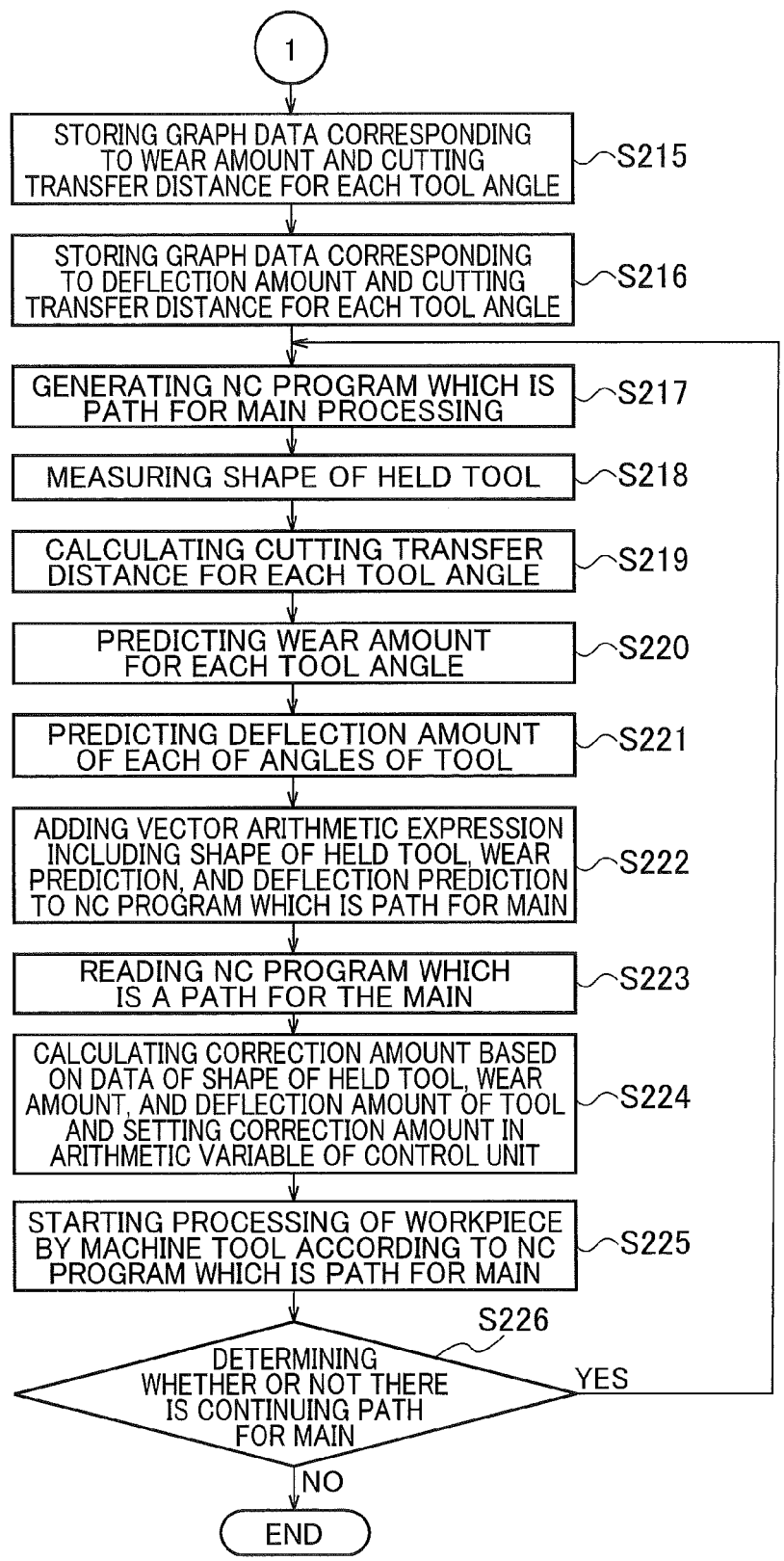
FIG. 23 is a flowchart of another embodiment of a processing procedure of a workpiece processing apparatus according to the present invention.

FIGS. 22 and 23 are flowcharts of a processing procedure of a workpiece processing apparatus according to another embodiment of the present invention.

First, in step 201 of FIG. 22, the CAM 39 generates an NC program for sample processing of the workpiece 5. Namely, the CAM 39 generates a three-dimensional coordinate of a processing path by the tool 3. In step 202, the shape of the held tool 3 is measured by the tool shape measuring device 31 for the initial calibration process described above.

Next, in step 203, the PC 33 adds a vector calculation expression considering the shape of the tool 3 to the NC program for sample processing. That is, for example, an arithmetic expression for correcting the coordinates of the tool 3 as shown in FIG. 21 is incorporated into the NC program.

As described above, since the arithmetic expression for correcting the position (coordinate value) of the tool 3 is incorporated in the NC program, it is possible to eliminate a need to re-create the NC program each time the tool is replaced, worn, or the like.

In other words, when a specific number is used, the NC program must be re-created every time a tool is changed or worn, etc., but by using an arithmetic expression, it is possible to cope with tool contour errors that change from time to time.

Further, by using the arithmetic expression, the measured tool contour value is stored as an arithmetic variable, and calculation (operation) is performed at the time of processing, so that once the NC program is created, it can be used thereafter. Further, since the arithmetic expression of the NC program is calculated by the control unit 13, a dedicated device is not required.

Further, according to the workpiece processing apparatus 1, since the NC program is configured to correct the position of the tool 3 by using an arithmetic expression in order to suppress the occurrence of the processing error of the workpiece 5 due to the contour error of the tool 3, the configuration of the NC program can be simplified.

Further, according to the workpiece processing apparatus 1, since the normal vector V1 at the processing point T1 of the tool 3 is obtained by using the CAD data 37 and the processing path 41, and the position of the tool 3 is corrected by using an arithmetic expression including the normal vector V1 and the contour error of the tool 3 at the processing point T1, the position of the held tool 3 can be surely and accurately corrected.

Next, in step 204, the control unit 13 reads the NC program for sample processing, and in step 205, the PC 33 calculates a tool shape correction amount in the NC program based on the tool shape collected in step 202, and sets the tool shape correction amount as an arithmetic variable in the memory or the like of the control unit 13.

Next, in step 206, the processing apparatus 1 performs sample processing of the workpiece 5 as a workpiece, in step 207, when the first step of the sample processing is completed, processing is interrupted. In step 208, the shape of the tool 3 on the processing apparatus 1 is measured by the tool shape measuring device 31, and in step 209, the shape of the workpiece 5 is measured.

Next, in step 210, the PC 33 compares the NC program with the CAD data of the machine tool 1, and calculates the cutting transfer distance of each of the regions R1 to R5 of the tool 3. That is, the cutting transfer distance for each tool angle is calculated.

A calculation method of "cutting transfer distance" will now be described with reference to FIGS. 13 and 14. For example, when the workpiece 5 having a curved surface is cut using a tool as shown in FIG. 13, as shown in FIG. 14(a), the tool 3 is continuously moved in a first direction (here, the direction indicated by the arrow Y1 is shown), further slid in a direction orthogonal to the first direction, and then moved again in the direction of arrow Y1 for cutting. At this time, a portion where the tip of the tool 3 comes into contact with the workpiece 5 can be recognized according to the processing shape, for example, as the processing point A shown in FIG. 14(b) and the processing point B shown in FIG. 14(c).

That is, it is possible to calculate the distance by which the tip of the tool 3 comes into contact with the workpiece 5 when the tool 3 transfers from the start to the end of the processing by the tool 3. Therefore, it is a cutting transfer distance. It is to be noted that a judgment of contact and non-contact is made, for example, when the depth of processing by the tool 3 is 0.5 μm or more from the surface of the workpiece 5. And, it is judged that the tool 3 and the workpiece 5 are in contact with each other. Alternatively, as another criterion, when the distance between the tool 3 and the surface of the finished shape of the workpiece 5 is equal to or less than a predetermined value, it is determined that the tool 3 and the workpiece 5 are in contact with each other. However, the invention is not limited to these.

Next, in step 211, the PC 33 calculates the wear amount M for each cutting transfer distance of the regions R1 to R5 from the shape of the tool 3 measured by the tool shape measuring device 31 in step 208. That is, the wear amount M for each cutting transfer distance for each tool angle is calculated.

Specifically, the graph shown in FIG. 15 is created, and the wear amount corresponding to the progress rate is calculated for each of the regions R1 to R5, and it stored in the PC 33.

Here, the relation between the cutting transfer distance and the wear amount of the tool 3 is calculated, and this relation is stored as a correspondence table in the memory or the like of the PC 33. The NC program is corrected by estimating the amount of the shape change of the tool 3 due to the wear in actual processing. A detailed explanation will be given below with an example.

FIG. 16 is an explanatory view showing the procedure of processing the workpiece 5 using the tool 3 and the cutting transfer distance of the tool 3. FIG. 16(a) shows the shape of the workpiece 5 having a flat surface portion and a curved surface portion on its surface. FIG. 16(b) is an explanatory view showing a processing path when the workpiece 5 is processed by the tool 3. As shown in FIG. 16(b), the workpiece 5 is processed while the tool 3 is transferred in a first direction (traverse direction), and the workpiece 5 is processed while repeating the operation of sliding the workpiece 5 in a second direction (pick feed direction) orthogonal to the first direction and transferring the workpiece 5 in the first direction.

FIG. 16(c) is a diagram showing an area of the tip portion of the tool 3, and FIG. 16(d) is a graph showing a relationship between the progress rate [%] of the NC program and the cutting transfer distance of each portion of the tip portion of the tool 3.

As shown in FIG. 16(c), the axial direction of the tool 3 is defined as "0°", the direction orthogonal to the axis of the tool 3 is defined as "90°", the vicinity of 0° is defined as a region R1, the vicinity of 90° is defined as a region R5, and the tip of the tool 3 is divided into five regions R1, R2, R3, R4, and R5. Then, the distance for cutting the workpiece 5 by the regions R1 to R5 can be calculated from the data of the NC program, for example, as shown in the graph of FIG. 16(d). In this embodiment, an example of dividing into five regions R1 to R5 will be described, but the present invention is not limited thereto.

Therefore, when the workpiece 5 is processed, data of the cutting transfer distances of the respective regions R1 to R5 with respect to the progress rate of the NC program can be obtained. That is, in the present embodiment, the cutting transfer distance when the tool 3 is in contact with the workpiece 5 in the processing path of the tool 3 when the workpiece 5 is actually processed is calculated. At this time, with reference to the CAD data, the areas R1 to R5 where the tool 3 is in contact with the workpiece 5 are specified, and the cutting distances of the respective areas R1 to R5 are obtained.

FIG. 17 is a graph showing the relationship between the cutting transfer distance and the wear amount M of each region R1 to R5 when the tool 3 is operated according to the NC program to machine the workpiece 5.

The relationship between the cutting transfer distance and the wear amount M of each of the regions R1 to R5 is determined as follows.

First, as the process for collecting the data of the wear amount M, the workpiece 5 is actually processed by using the tool 3, and the wear amount during the processing is measured and stored in the memory or the like. That is, the wear amount of the tool 3 is obtained by comparing the measurement results of the tool shape before and after processing.

Then, a processing path from the start of processing of the workpiece 5 by the tool 3 to the end of processing is acquired. And, a place where the tool 3 is brought into contact with the workpiece 5 and a place where the tool 3 is not brought into contact with the workpiece 5 are calculated in the processing path. And, a transferring distance at the place where the tool 3 is brought into contact with the workpiece 5 is defined as "cutting transfer distance".

In this way, the relationship between the cutting transfer distance and the wear amount M of each of the regions R1 to R5 can be obtained.

As can be understood from the graph of FIG. 17, it is understood that, if the cutting transfer distance is constant, the wear amount is small in the region R1 near the tip "0°" of the tool 3, the wear amount is large in the region R2, and further, the wear amount is small toward the region R5. In general, the wear amount is R2>R3>R4>R5>R1.

The PC 33 can estimate the wear amount of each region R1 to R5 with respect to the progress rate of the NC program based on the graph shown in FIG. 16(d) and the graph shown in FIG. 17. For example, the graph shown in FIG. 15 is obtained.

With reference to the graph shown in FIG. 15, the PC 33 can calculate the wear amount M of each of the regions R1 to R5 with respect to the progress rate of the NC program. By correcting the shape of the tool 3 using the calculation result, high-precision processing is performed. In the detailed correction method, the contour error due to the initial calibration process described above is calculated, and the NC program is corrected in consideration of the wear amount M described above.

Specifically, the wear amount M is calculated for each of the 91 angles from 0° to 90° of the tip of the tool 3, and a contour error based on the shape (that is, the shape of the tool 3 in consideration of the wear amount M) of the tool 3 when the NC program progress rate is 100% is stored in the memory of the control unit 13 as a reference symbol "#600~#690". Namely, "#500 to #590" is a reference symbol due to a contour error not considering the wear amount M, and "#600 to #690" is a reference symbol due to a contour error considering the wear amount M.

Then, the PC 33 calculates a correction value by distributing reference symbols #500 to #590 and #600 to #690 according to the progress rate of processing and corrects the NC program.

Next, in step 212, the PC 33 calculates a deflection amount L for each cutting transfer distance of the regions R1 to R5. That is, a correspondence relationship between the deflection amount L for each tool angle and the cutting transfer distance is calculated.

Specifically, the graph shown in FIG. 19 is generated, and the deflection amount L corresponding to the progress rate is calculated for each of the regions R1 to R5 and stored in the PC 33.

Here, the relation between the cutting transfer distance and the deflection amount L of the tool 3 is calculated, and this relation is stored in a memory or the like as a correspondence table. The NC program is corrected by estimating the amount of the shape change due to the deflection of the tool 3 in the actual processing. The following is a detailed description.

FIG. 16 shows the procedure of processing the workpiece 5 using the tool 3 and the cutting transfer distance of the tool 3.

As described above, the distance for cutting the workpiece 5 by the regions R1 to R5 can be calculated from the data of the NC program, for example, as shown in the graph of FIG. 16(d). In this embodiment, an example of dividing into five regions R1 to R5 will be described, but the present invention is not limited thereto.

Therefore, when the workpiece 5 is processed, data of the cutting transfer distances of the respective regions R1 to R5 with respect to the progress rate of the NC program can be obtained.

FIG. 18 is a graph showing the relationship between the cutting transfer distance and the deflection amount L of each region R1 to R5 when the tool 3 is operated according to the NC program to process the workpiece 5.

Here, the relationship between the cutting transfer distance and the deflection amount L of each of the regions R1 to R5 is obtained as follows.

First, the data of the wear amount M of the tool 3 is collected. Here, the workpiece 5 is actually processed by using the tool 3, and the wear amount in this processing is measured and stored in the memory or the like. That is, the wear amount of the tool 3 is obtained by comparing the measurement results of the tool shape before and after processing.

Next, the shape of the workpiece after processing is measured, and the amount of unprocessed portions is obtained by comparing the measured shape with the original shape to be processed (CAD data, etc.). Namely, since the cause of the unshaved portions is wear and deflection, when the amount of unshaved portions is larger than the wear amount, the amount of unshaved portions becomes deflection.

Therefore, the deflection amount can be obtained from the equation of "the amount of unshaved work—the wear amount=the deflection amount".

Then, a processing path from the start of processing of the workpiece 5 by the tool 3 to the end of processing is acquired, a place where the tool 3 is brought into contact with the workpiece 5 and a place where the tool 3 is not brought into contact with the workpiece 5 are calculated in the processing path, and a transferring distance at the place where the tool 3 is brought into contact with the workpiece 5 is defined as "cutting transfer distance".

Thus, the relationship between the cutting transfer distance and the deflection amount L of each of the regions R1 to R5 can be obtained.

As can be understood from the graph of FIG. 18, it is understood that if the cutting transfer distance is constant, the deflection amount L is small in the region R1 near the tip "0°" of the tool 3, the deflection amount L is large in the region R2, and further, the deflection amount L is small toward the region R5. That is, in general, the magnitude of the deflection amount L is R2>R3>R4>R5>R1.

Then, the control unit 13 can estimate the deflection amounts L of the regions R1 to R5 with respect to the progress rate of the NC program based on the graph shown in FIG. 16(*d*) and the graph shown in FIG. 18. For example, the graph shown in FIG. 19 is obtained.

By referring to the graph shown in FIG. 19, the deflection amounts L of the respective regions R1 to R5 with respect to the progress rate of the NC program can be estimated. The shape of the tool 3 is corrected using the estimation result to perform high-precision processing. In the detailed correction method, the contour error is calculated by the initial calibration process described above, and the NC program is corrected in consideration of the deflection amount L described above.

Specifically, the deflection amount L is calculated for each of 91 angles from 0° to 90° of the tip of the tool 3, and a contour error based on the shape (that is, the shape of the tool 3 in consideration of the deflection amount L) of the tool 3 when the NC program progress rate is 100% is stored in the memory of the control unit 13 as a reference symbol "#600~#690". Namely, "#500 to #590" is a reference symbol due to a contour error which does not consider the deflection amount L, and "#600 to #690" is a reference symbol due to a contour error which considers the deflection amount L.

Then, reference symbols #500 to #590 and reference symbols #600 to #690 are distributed according to the progress rate of processing to calculate a correction value and correct the NC program.

FIG. 20 is an explanatory diagram showing the allocation rates of the reference symbols #500 and #600 for each angle from 0° to 90°. The distribution rate from the start of processing by the tool 3 to the end is set.

As can be seen from FIG. 20, before the start of processing, reference symbols #500 to #590 due to contour errors not taking into account the wear amount M and the deflection amount L are 100%, and reference symbols #600 to #690 due to contour errors taking into account the wear amount M and the deflection amount L are 0%. Thereafter, as the progress rate increases, the ratio of reference symbols #600 to #690 is increased, and the ratio of reference symbols #500 to #590 is decreased. At the end of processing, reference symbols #500 to #590 due to contour errors not considering the wear amount M and the deflection amount L are 0%, and reference symbols #600 to #690 due to contour errors considering the wear amount M and the deflection amount L are 100%.

For example, taking [−1.68077+[−0.90974*[#565*0.227+#566*0.773]]] as an example, which is the X component described in (f85) in FIG. 9, reference symbol "#565" is a numerical value obtained by dividing "#565" and "#665" by a predetermined ratio. Similarly, the reference point "#566" is a numerical value obtained by dividing "#566" and "#666" by a predetermined ratio.

Specifically, "#565" shown in (f85) of FIG. 9 is defined as "(0.667) (#565)+(0.333) (#665)". In this case, the ratio of the reference symbol #565 due to the contour error not considering the wear amount M and the deflection amount L is "0.667", and the ratio of the reference symbol #665 due to the contour error considering the wear amount M and the deflection amount L is "0.333".

That is, when the angle is 65°, X coordinates are calculated as shown by the equation in FIG. 21. Although the Y coordinate and the Z coordinate are not described, they are arithmetic expressions similar to the X coordinate.

The actual tool shape after changing due to wear and deflection is not known until processing is completed and measurements are performed. However, the wear amount and the deflection amount can be calculated by referring to the graphs shown in FIGS. 15 and 19.

In step 213, the PC 33 stores the relationship among the deflection amount L, the friction amount M, and the cutting transfer distance at each angle (0° to 90°) of the tool 3 at the time of finishing the processing.

The total wear amount and the total deflection amount are read into the control unit 13 of the processing apparatus 1 by the PC 33. The total deflection amount of the total wear amount at each angle (0° to) 90° of the tool 3 at the end of processing may be stored in an exclusive file or the like.

Next, in step 214, the PC 33 determines whether or not all sample processing steps have been completed, and if all sample processing steps have not been completed, the above step 206~213 is repeated until all sample processing steps have been completed.

If it is determined in step 214 that all the sample processing steps have been completed, in step 215 of FIG. 23, the PC 33 generates graph data corresponding to the wear amount and the cutting transfer distance for each tool angle at the time when all the sample processing steps have been completed. And, when all the sample processing steps have been completed, the graph data corresponding to the deflection amount and the cutting transfer distance for each tool angle at the time is stored in the memory or the like of the PC 33. And, in step 216, the PC 33 generates graph data corresponding to the deflection amount and the cutting transfer distance for each tool angle at the time when all the sample processing steps have been completed, and the graph data is stored in the memory or the like of the PC 33.

Next, in step 217, the CAM 39 generates an NC program which is a path for the main processing of the workpiece 5, and in step 218, the PC 33 measures the shape of the held tool 3 in the main processing by the tool shape measuring device 31.

Then, in step 219, the NC program for the main processing is compared with the CAD data by the PC 33, the cutting transfer distance for each tool angle is calculated, in step 220, the wear amount for each tool angle is predicted by the PC 33, and in step 221, the deflection amount for each tool angle is predicted by the PC 33.

Next, in step 222, the PC 33 adds a vector calculation formula considering the shape of the tool, the wear amount, and the deflection amount to the NC program for the main processing. And, in step 223, the PC 33 reads the NC program for the main processing into the control unit 13 of the processing apparatus 1, and in step 224, the PC 33 calculates the amount of correction based on the shape of the tool, the wear amount, and the deflection amount. And, the amount of correction is set as a calculation variable in the control unit 13 of the processing apparatus 1. The processing contents of step 217~224 are the same as those of the sample processing.

Then, in step 225, the main processing of the workpiece is started by the processing apparatus 1 based on the control of the control unit 13 on the NC program for the main processing. And, in step 226, it is determined whether there is another continuous main processing, and if there is another continuous main processing, the process returns to step 217, and if there is no other continuous main processing, the process ends.

In addition to the deflection of the tool itself, the deflection of the tool may be caused by a change in the attitude of the bearing of the tool.

Figure 24:
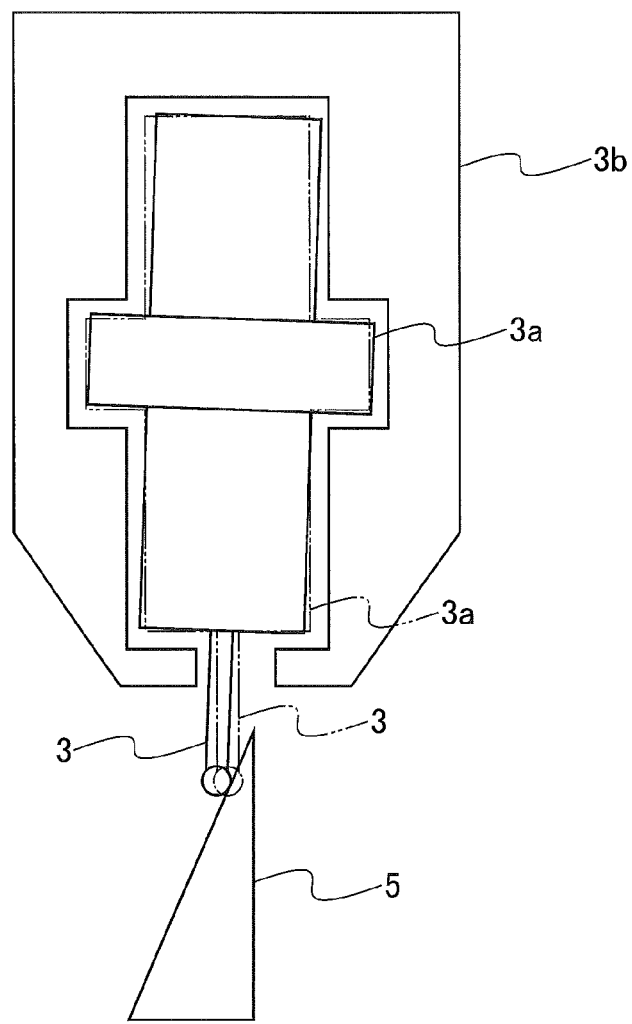
FIG. 24 is a schematic drawing showing how a posture of a bearing of the tool is changed.

FIG. 24 is a schematic view showing the attitude change of the bearing of the tool.

As shown in FIG. 24, when the bearing 3a on which the tool 3 is mounted is held in the tool holding member 3b by the static air pressure, the bearing 3a sometimes changes its attitude in the tool holding member 3b.

In FIG. 24, the normal state of the bearing 3a is indicated by a dotted line, and the state in which the bearing 3a changes its attitude is indicated by a solid line.

As described above, even when the bearing 3a changes its attitude in the tool holding member 3b, the processing procedure shown in FIG. 12, FIG. 22, or FIG. 23 according to the present invention described above can be applied to process the workpiece 5 in which the contour error is corrected.

INDUSTRIAL APPLICABILITY

According to the present invention, in the workpiece processing method and the workpiece processing apparatus for processing the workpiece while correcting the position of the tool in accordance with the contour error of the tool, it is possible to eliminate a need to remake the NC program every time the tool is changed, or the tool is worn or deflected.

The invention claimed is:

1. A processing method for processing a workpiece into a desired shape by a tool, comprising:
   incorporating an arithmetic expression for correcting a position of the tool into an Numerical Control (NC) program, the NC program being configured to correct the position of the tool by directly inserting coded numerical instructions into the tool;
   calculating a processing path along which the tool transfers according to the NC program;
   calculating a cutting transfer distance for cutting the workpiece by each part of the tool from the processing path;
   calculating a wear amount and a deflection amount of each part of the tool from the cutting transfer distance;
   correcting the NC program by the wear amount and the deflection amount in addition to a contour error of the tool; and
   performing processing by the corrected NC program.

2. The processing method as claimed in claim 1, wherein the correcting of the NC program comprises correcting the position of the tool by using the arithmetic expression in order to suppress an occurrence of a processing error of the work due to the contour error of the tool.

3. The processing method as claimed in claim 1, wherein a ratio of a correction amount due to the contour error without account the wear amount and the deflection amount and a correction amount due to a contour error with account the wear amount and the deflection amount are set, and the ratio of a correction amount due to the contour error without account the wear amount and the deflection amount is decreased and the ratio of a correction amount due to a contour error with account the wear amount and the deflection amount is increased as the processing path transfers from a start of the processing to an end of the processing.

4. The processing method as claimed in claim 1, wherein the wear amount is obtained from a change in a shape of the tool measured before and after processing, an uncut amount is obtained by subtracting a shape of the workpiece to be processed from the shape of the workpiece measured after processing, and the deflection amount is obtained by subtracting the wear amount from the uncut amount.

5. A processing apparatus for processing a workpiece into a desired shape by a tool, comprising:
   the tool;
   a processor; and
   a non-transitory memory storing a Numerical Control (NC) program that is configured to correct a position of the tool by directly inserting coded numerical instructions into the tool and instructions that, when executed by the processor, cause the processor to perform processing comprising:
      incorporating an arithmetic expression for correcting a position of the tool into the NC program,
      calculating a processing path along which the tool transfers based on the NC program,
      calculating a cutting transfer distance for cutting the workpiece by each part of the tool from the processing path,
      calculating a wear amount and a deflection amount of each part of the tool from the cutting transfer distance,
      correcting the NC program by the wear amount and the deflection amount in addition to a contour error of the tool, and
      performing processing by the corrected NC program.

6. A method for generating an Numerical Control (NC) program for processing a workpiece into a desired shape by a tool by directly inserting coded numerical instructions into the tool, the method comprising:
   incorporating into the NC program an arithmetic expression for correcting a position of the tool;
   incorporating into the arithmetic expression a normal unit vector and a variable for correcting a contour error of the tool in a normal direction of a processing point;
   calculating, based on the NC program, a processing path through which the tool transfers;
   calculating, from the processing path, a cutting transfer distance in which each part of the tool cuts the workpiece;
   calculating, from the cutting transfer distance, a wear amount and a deflection amount of each part of the tool; and
   correcting the NC program by the wear amount and the deflection amount in addition to the contour error of the tool.

* * * * *